(12) United States Patent
Hu

(10) Patent No.: US 7,950,358 B2
(45) Date of Patent: May 31, 2011

(54) EIGHT-STROKE ENGINE WITH COORDINATION PRESSURE MANAGEMENT SYSTEM

(76) Inventor: Lung-tan Hu, Aldergrove (CA)

( * ) Notice: Subject to any disclaimer, the term of this patent is extended or adjusted under 35 U.S.C. 154(b) by 0 days.

(21) Appl. No.: 12/586,634

(22) Filed: Sep. 25, 2009

(65) Prior Publication Data

US 2010/0018479 A1    Jan. 28, 2010

Related U.S. Application Data

(63) Continuation-in-part of application No. 10/619,147, filed on Jul. 15, 2003, now Pat. No. 6,918,358.

(51) Int. Cl.
*F02B 25/00* (2006.01)
*F02B 75/20* (2006.01)
(52) U.S. Cl. ............... 123/70 R; 123/316; 123/59.6
(58) Field of Classification Search .......... 123/68, 123/69 R, 70 R, 311, 316, 52.4, 52.6, 53.2, 123/59.6
See application file for complete search history.

(56) References Cited

U.S. PATENT DOCUMENTS 5,638,777 A * 6/1997 Van Avermaete .......... 123/70 R
* cited by examiner

*Primary Examiner* — Noah Kamen

(57) ABSTRACT

The present invention provides a coordination pressure management system for raising the maximum operational range of the eight-stroke engine; said coordination pressure management system includes a real-time control system for adjusting the phase-difference between the master piston and the slave piston according to the combustion condition of the master cylinder and the compression condition of the slave cylinder, so that the maximum compression pressure of the slave-compression-process is regulated within the range of 75% to 25% of the concurrent maximum combustion pressure of the master cylinder, thereby maintaining a high coordination-efficiency in any operational load and rpm condition.

In addition the coordination pressure management system is able to provide a flow of high-density-air at controlled temperature in the heavy load operation, which ensures a stable cooling effect to the hot-combustion-medium of the master cylinder, so that the overall temperature of the master cylinder can be reduced in the heavy load operation for better durability and higher fuel efficiency.

17 Claims, 31 Drawing Sheets

Crankshaft Side View

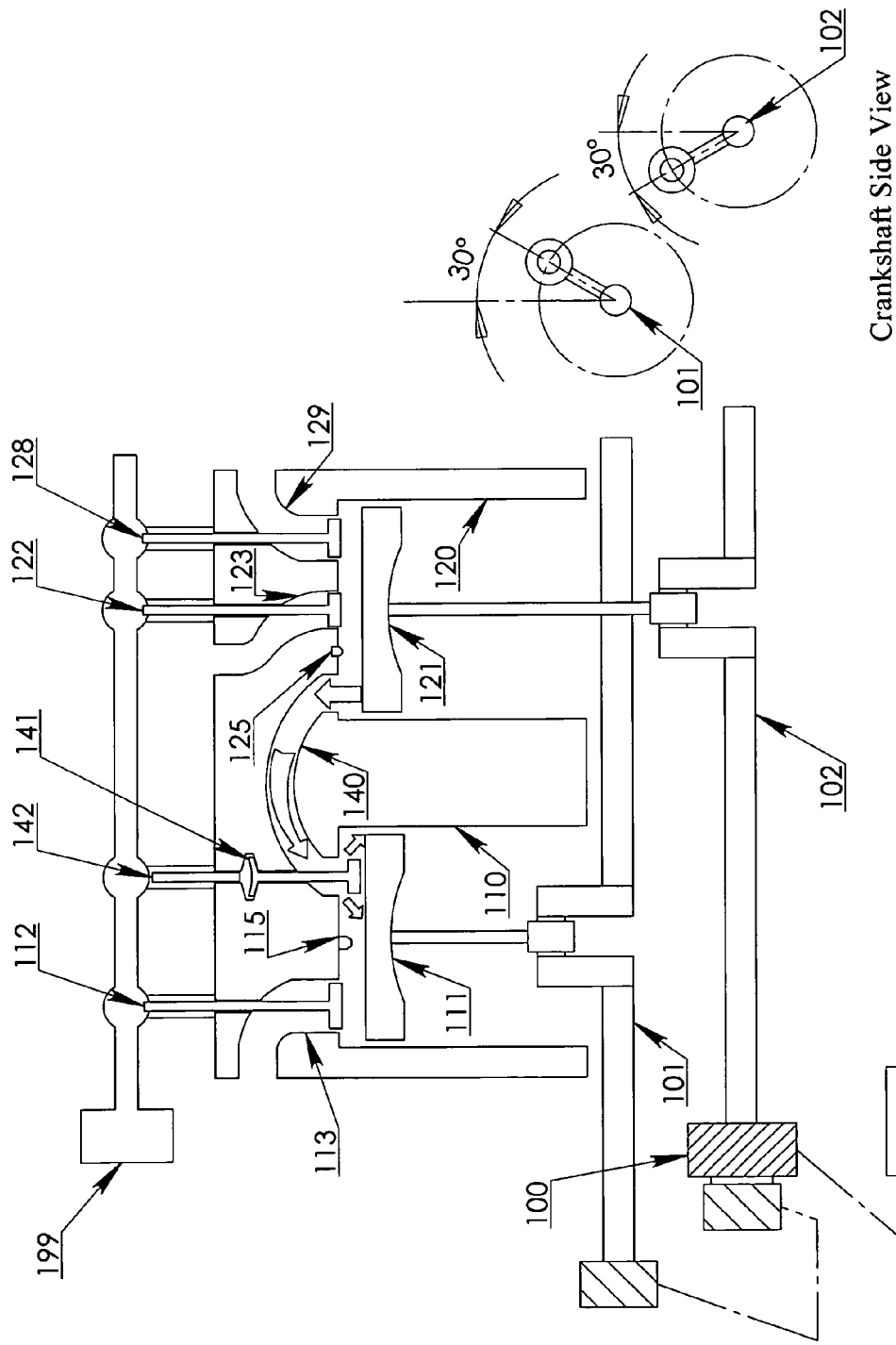
FIG.1.Light

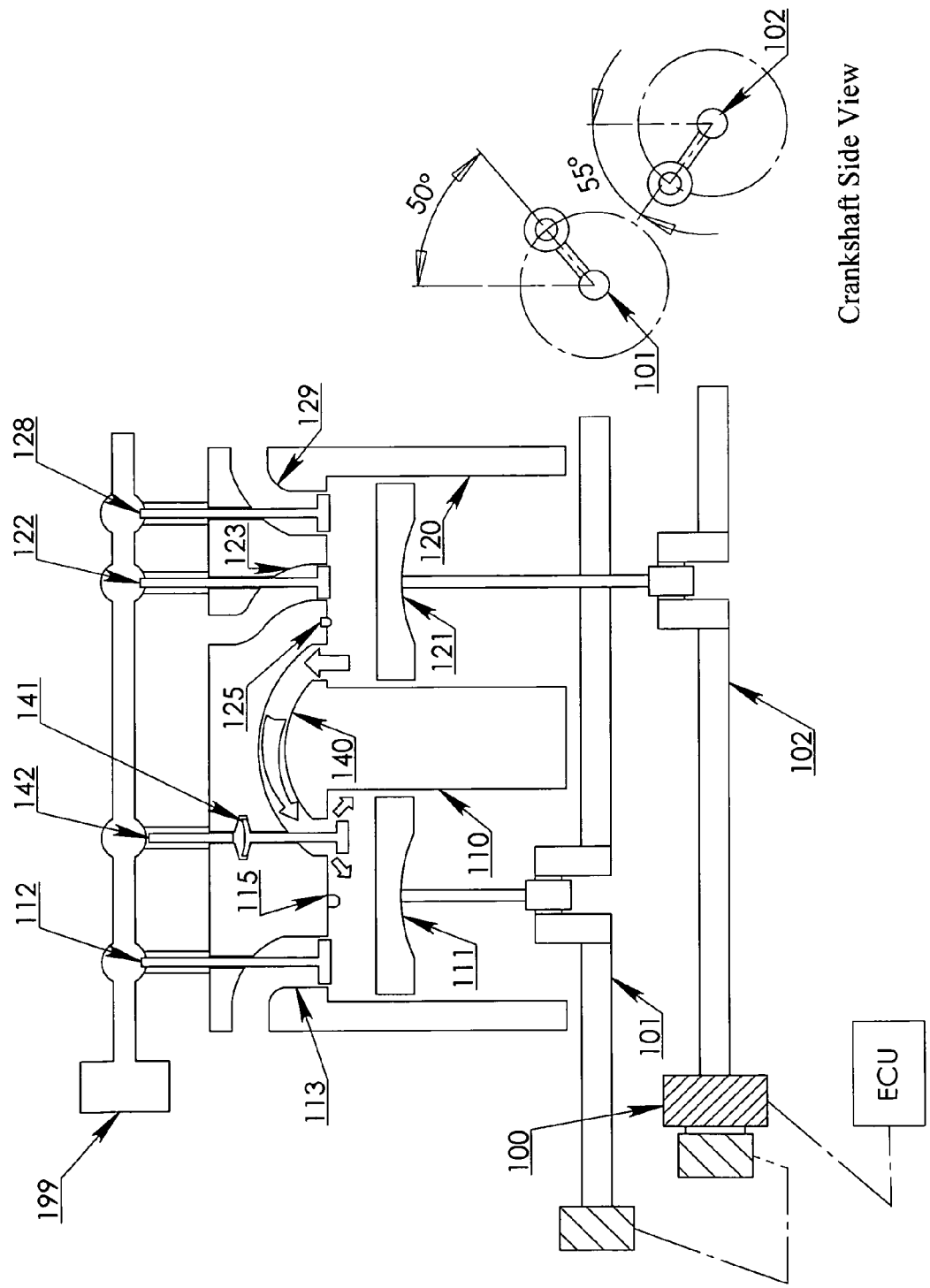
FIG.1.Medium

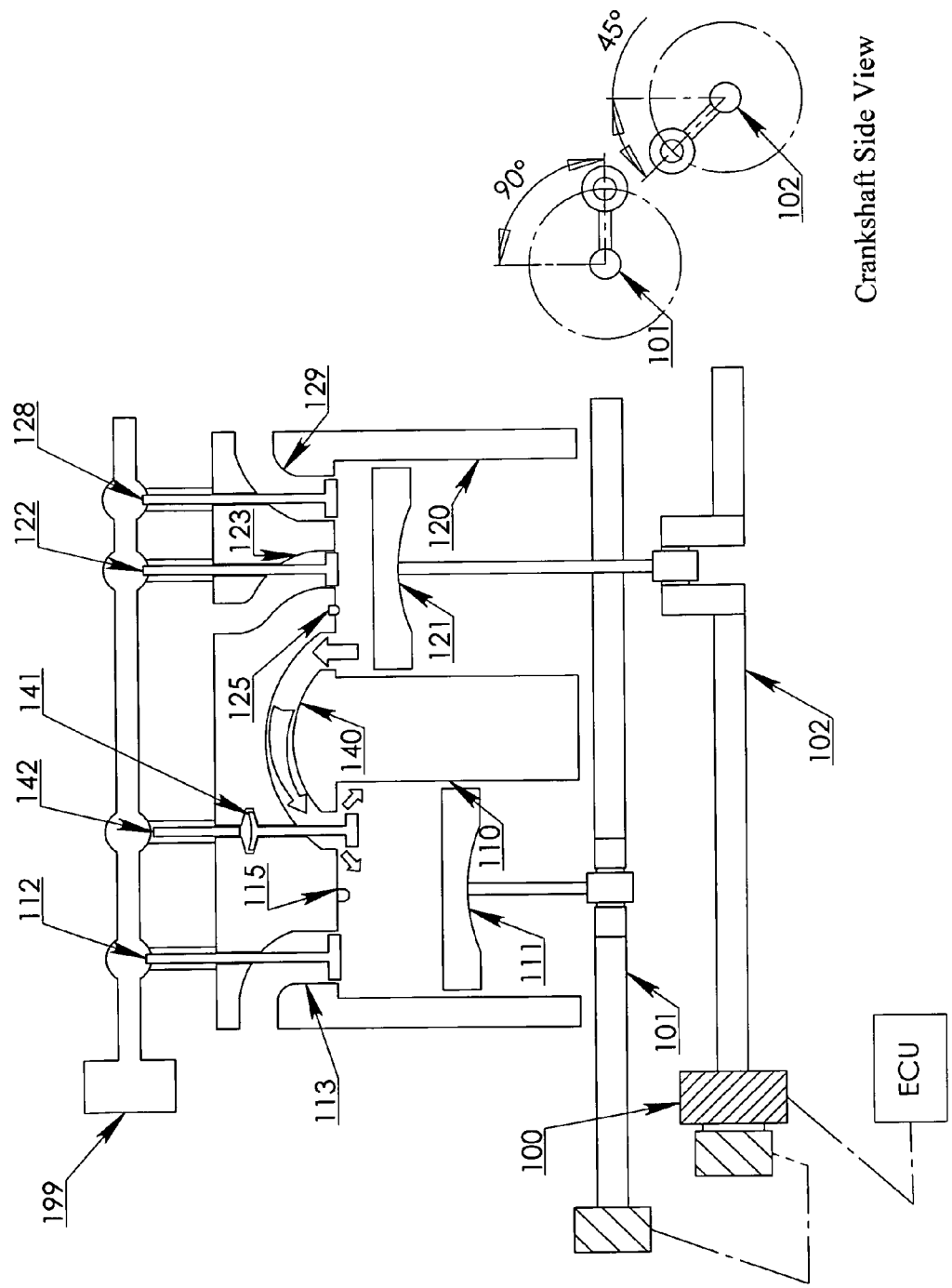
FIG.1.Heavy

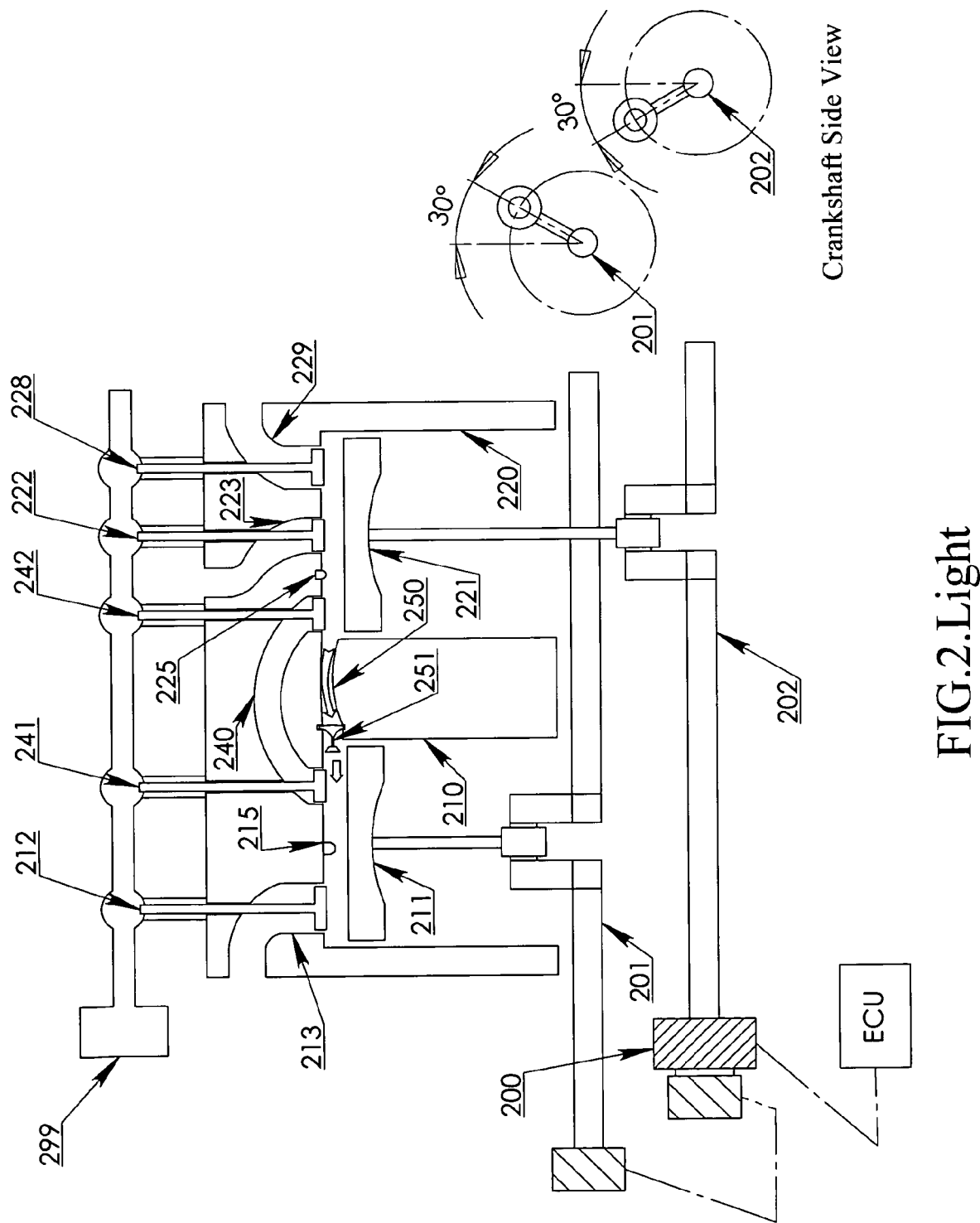
FIG.2.Light

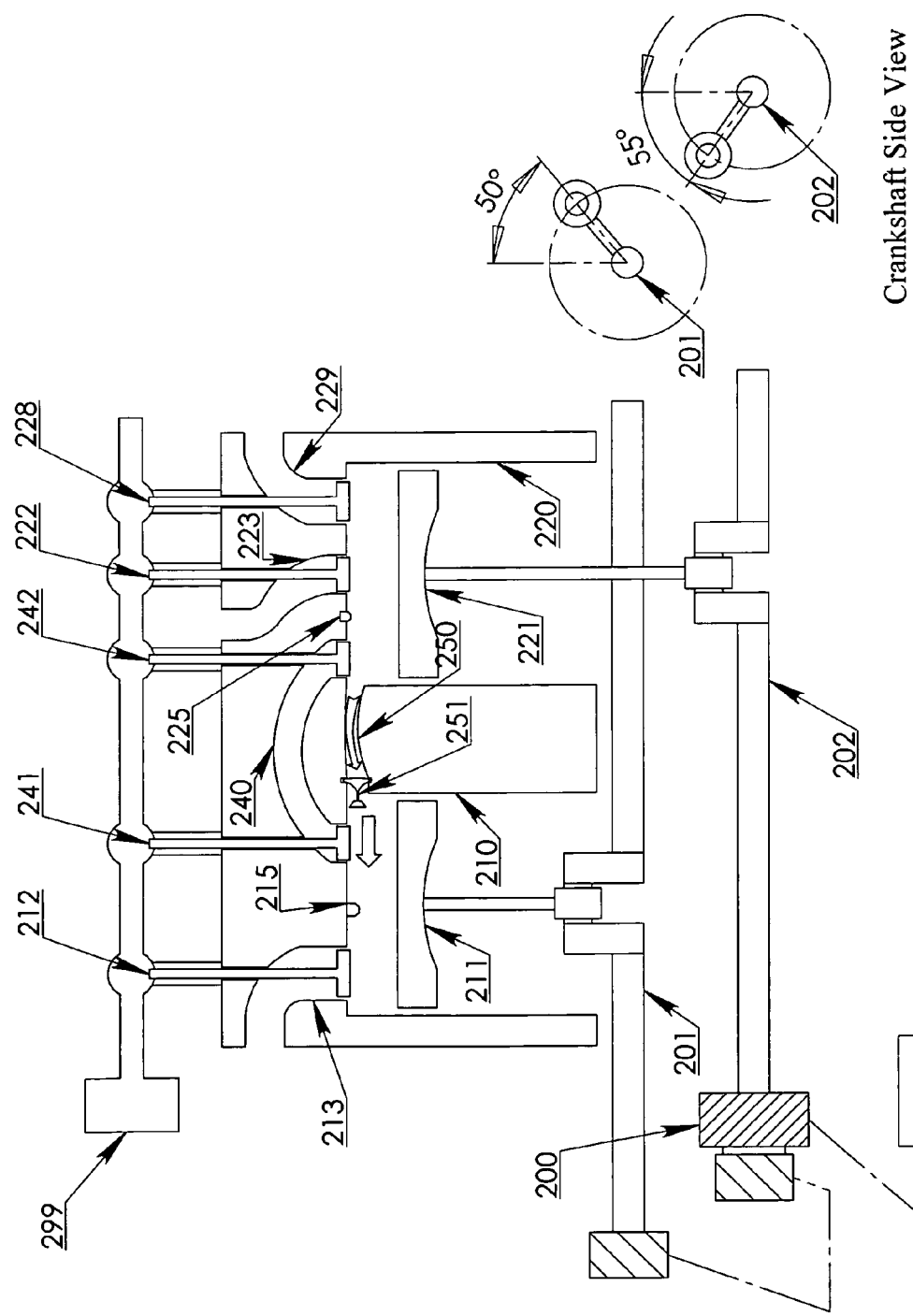
FIG.2.Medium

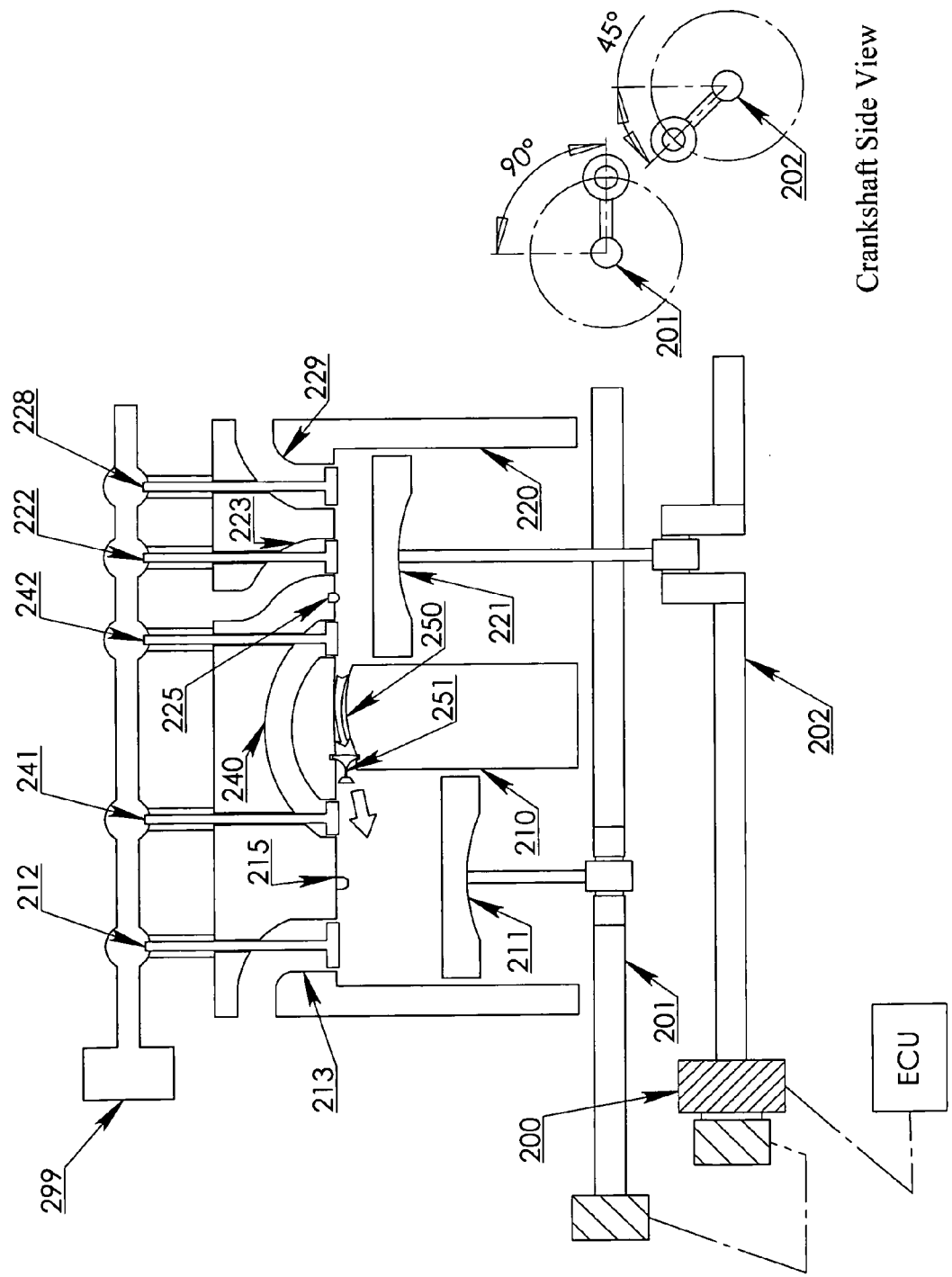
FIG.2.Heavy

Flat-type eight-stroke engine

FIG.5 A-type eight-stroke engine

Operation table of eight-stroke cycle with the phase-difference reset to 60 degree 8-process-sequence note:
1st = the master-intake-process
2nd = the slave-intake-process
3rd = the master-compression-process
4th = the slave-compression-process
5th = the hot-combustion-process
6th = the injection-process
7th = the cold-expansion-process
8th = the slave-exhaust-process Operation table of eight-stroke cycle with the phase-difference reset to 135 degree 8-process-sequence note:
1st = the master-intake-process
2nd = the slave-intake-process
3rd = the master-compression-process
4th = the slave-compression-process
5th = the hot-combustion-process
6th = the injection-process
7th = the cold-expansion-process
8th = the slave-exhaust-process An eight-stroke-cycle configured with 90 degree phase-difference

US 7,950,358 B2

EIGHT-STROKE ENGINE WITH COORDINATION PRESSURE MANAGEMENT SYSTEM

The present invention is a continuation-in-part application of the eight-stroke internal combustion engine (filed on Jul. 15, 2003 with application Ser. No. 10/619,147 now U.S. Pat. No. 6,918,358).

FIELD OF THE INVENTION

The present invention relates to a coordination pressure management system of the eight-stroke internal combustion engine; and more particularly to the improvements on the coordination system of the eight-stroke engine.

The present invention can be used in the field of transportation vehicle, power generation.

BACKGROUND OF THE INVENTION

The present invention is a continuation-in-part application of the eight-stroke internal combustion engine, which was filed as U.S. Pat. No. 6,918,358 (application Ser. No. 10/619,147), and the engine of this type can also be abbreviated as the eight-stroke engine.

The fuel efficiency of the eight-stroke engine is relatively higher than the conventional four-stroke engine (over 35% for gasoline type gasoline engine and 45% for diesel type eight-stroke engine) under the condition that the engine load is controlled within the designated load condition, however, this designed load condition is very limited due to the excessive compression loss and heat loss from the slave-compression-stroke, in other words, the power-to-weight ratio is limited by these energy losses in the slave-compression-process, therefore the main objective of the present invention is to provide a coordination pressure management system to regulate the energy consumed by the slave-compression-stroke, and at the same time regulating the maximum pressure and temperature of the high-density-air in the coordinate-port (or the charge-coordinate-channel) prior to the injection-process.

As the present invention may have a great influence to those skilled in the art of the internal combustion engine, the disclosure is written in a comprehensive style with a clear step-by-step reference of the eight-stroke-cycle.

SUMMARY OF THE INVENTION

It is the main objective of the present invention to provide a coordination pressure management system for the eight-stroke engine to improve the fuel efficiency in the light load operation and heavy load operation.

It is the second objective of the present invention to provide a coordination pressure management system for the eight-stroke engine that can control the maximum pressure and the temperature of the high-density-air in the coordinate-port prior to the injection-process.

It is the third objective of the present invention to provide a coordination pressure management system for the eight-stroke engine that increases the coordination-efficiency and the power-to-weight ratio.

It is the fourth objective of the present invention to provide a coordination pressure management system that is capable of increasing the fuel efficiency of the gasoline type eight-stroke engine to over 35% in heavy load operation.

It is the fifth objective of the present invention to provide a coordination pressure management system that is capable of increasing the fuel efficiency of the diesel type eight-stroke engine to over 45% in heavy load operation.

BRIEF DESCRIPTION OF THE DRAWINGS

FIG. 1A is the illustrative view of the first embodiment in the master-intake-process at 30 degree of crankshaft reference angle, wherein the master-intake-valve is open to admit air into the master cylinder.

FIG. 1B is the illustrative view of the first embodiment in the slave-intake-process at 120 degree of crankshaft reference angle, wherein the slave-intake-valve is open to admit air into the slave cylinder.

FIG. 1C is the illustrative view of the first embodiment in the master-compression-process at 210 degree of crankshaft reference angle, wherein the master piston is compressing the air in the master cylinder.

FIG. 1D is the illustrative view of the first embodiment in the slave-compression-process at 315 degree of crankshaft reference angle, wherein the slave piston is compressing the air into the coordinate-port as a high-density-air.

FIG. 1E is the illustrative view of the first embodiment in the hot-combustion-process at 370 degree of crankshaft reference angle, wherein an air-fuel mixture is ignited and combusted in the master cylinder as a hot-combustion-medium, the air-pressure of the coordinate-port is still increasing as the slave piston reciprocates upward.

FIG. 1F is the illustrative view of the first embodiment in the injection-process at 425 degree of crankshaft reference angle, wherein the pressure of the hot-combustion-medium decreases to lower than the air-pressure of the coordinate-port, and the high-density-air of the coordinate-port is injecting into the master cylinder to mix with the hot-combustion-medium, thereby forming a cold-expansion-medium in the master cylinder.

FIG. 1G is the illustrative view of the first embodiment in the cold-expansion-process at 485 degree of crankshaft reference angle, wherein the cold-expansion-medium is expanding in both the master cylinder and the slave cylinder, and the coordinate-valve is opened with the camshaft system to allow the cold-expansion-medium of the master cylinder to flow into the slave cylinder.

FIG. 1H is the illustrative view of the first embodiment in the slave-exhaust-process at 580 degree of crankshaft reference angle, wherein the slave-exhaust-valve is open to expel the cold-expansion-medium out of the slave cylinder.

FIG. 1. Light is the illustrative view of the first embodiment at the initiation point (390 degree) of the injection-process in the light load operation, wherein the phase-difference is adjusted to 60 degree with the coordination pressure management system to control the injection pressure.

FIG. 1. Medium is the illustrative view of the first embodiment at the initiation point (410 degree) of the injection-process in the medium load operation, wherein the phase-difference is adjusted to 105 degree with the coordination pressure management system to control the injection pressure.

FIG. 1. Heavy is the illustrative view of the first embodiment at the initiation point (450 degree) of the injection-process in the heavy load operation, wherein the phase-difference is adjusted to 135 degree with the coordination pressure management system to control the injection pressure.

FIG. 2A is the illustrative view of the second embodiment in the master-intake-process at 30 degree of crankshaft reference angle, wherein the master-intake-valve is open to admit air into the master cylinder.

FIG. 2B is the illustrative view of the second embodiment in the slave-intake-process at 120 degree of crankshaft reference angle, wherein the slave-intake-valve is open to admit air into the slave cylinder.

FIG. 2C is the illustrative view of the second embodiment in the master-compression-process at 210 degree of crankshaft reference angle, wherein the master piston is compressing the air in the master cylinder.

FIG. 2D is the illustrative view of the second embodiment in the slave-compression-process at 315 degree of crankshaft reference angle, wherein the slave piston is compressing the air into the charge-coordinate-channel as a high-density-air.

FIG. 2E is the illustrative view of the second embodiment in the hot-combustion-process at 370 degree of crankshaft reference angle, wherein an air-fuel mixture is ignited and combusted in the master cylinder as a hot-combustion-medium, the air-pressure of the charge-coordinate-channel is still increasing as the slave piston reciprocates upward.

FIG. 2F is the illustrative view of the second embodiment in the injection-process at 425 degree of crankshaft reference angle, wherein the pressure of the hot-combustion-medium decreases to lower than the air-pressure of the charge-coordinate-channel, and the high-density-air of the charge-coordinate-channel is injecting into the master cylinder to mix with the hot-combustion-medium, thereby forming a cold-expansion-medium in the master cylinder.

FIG. 2G is the illustrative view of the second embodiment in the cold-expansion-process at 485 degree of crankshaft reference angle, wherein the cold-expansion-medium is expanding in both the master cylinder and the slave cylinder, and the reverse-input-valve and the reverse-output-valve are opened with the camshaft system, so that the cold-expansion-medium is flowing into the slave cylinder through the reverse-channel.

FIG. 2H is the illustrative view of the second embodiment in the slave-exhaust-process at 580 degree of crankshaft reference angle, wherein the slave-exhaust-valve is open to expel the cold-expansion-medium out of the slave cylinder.

FIG. 2. Light is the illustrative view of the second embodiment at the initiation point (390 degree) of the injection-process in the light load operation, wherein the phase-difference is adjusted to 60 degree with the coordination pressure management system to control the injection pressure.

FIG. 2. Medium is the illustrative view of the second embodiment at the initiation point (410 degree) of the injection-process in the medium load operation, wherein the phase-difference is adjusted to 105 degree with the coordination pressure management system to control the injection pressure.

FIG. 2. Heavy is the illustrative view of the second embodiment at the initiation point (450 degree) of the injection-process in the heavy load operation, wherein the phase-difference is adjusted to 135 degree with the coordination pressure management system to control the injection pressure.

DETAILED DESCRIPTION OF THE PREFERRED EMBODIMENTS

The coordination pressure management system for the eight-stroke engine is a specialized system to co-act with any type of the eight-stroke engines operating on the principle of eight-stroke-cycle; the eight-stroke-cycle consists of the master-intake-stroke, the slave-intake-stroke, the master-compression-stroke, the slave-compression-stroke, the master-expansion-stroke, the slave-expansion-stroke, the master-exhaust-stroke, the slave-exhaust-stroke; wherein the master-intake-stroke, the master-expansion-stroke, the slave-intake-stroke and the slave-expansion-stroke are down-strokes; the master-compression-stroke, the master-exhaust-stroke, the slave-compression-stroke and the slave-exhaust-stroke are up-strokes.

In order to precisely describe the details of the eight-stroke-cycle, the eight-stroke-cycle will be elaborated with the 8-process-sequence, which describes the eight-stroke-cycle in respect to the air flows in the master cylinder and the slave cylinder.

The 8-process-sequence consists of the master-intake-process, the slave-intake-process, the master-compression-process, the slave-compression-process, the hot-combustion-process, the injection-process, the cold-expansion-process, the slave-exhaust-process.

The first embodiment will be configured with an eight-stroke engine with a coordinate-port; the second embodiment will be configured with an eight-stroke engine with a charge-coordinate-channel and reverse-channel.

Figure 1A:
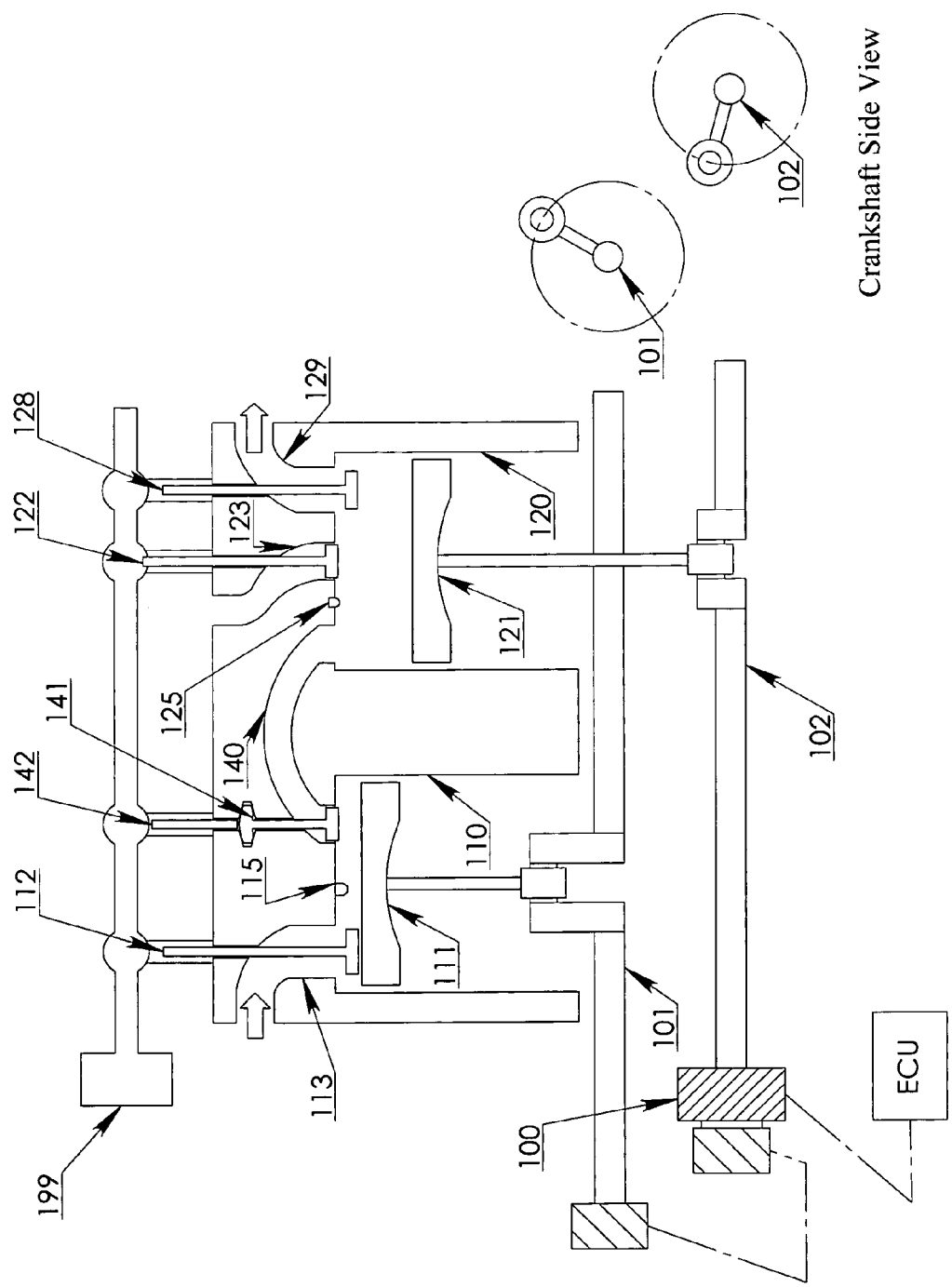
FIG. 1A to FIG. 1H are the illustrative views of the first embodiment in difference processes, wherein the phase-difference is adjusted to 105 degree with the coordination pressure management system.

Now referring to FIG. 1A for the structural description of the first embodiment, the basic components are labeled as follows, the master-intake-port 112, the master-intake-valve 112, the master piston 111, the master cylinder 110, the slave-intake-port 123, the slave-intake-valve 122, the slave-exhaust-port 129, the slave-exhaust-valve 128, the slave piston 121, the slave cylinder 120, the coordinate-port 140, the coordinate-valve 141, the coordinate-push-rod 142, the slave-crankshaft 102, the master-crankshaft 101, the crank-phase-adjustor 100, the ignition means 115, the slave-pressure-sensor 125, the camshaft system 199, and the ECU (engine control unit).

The master cylinder 110 includes a master piston 111, the slave cylinder 120 includes a slave piston 121, wherein the crank-phase-adjustor 100 can have a maximum adjustable range of 90 degree, so that the phase-difference between the master piston 111 and the slave piston 121 can be adjusted within the range from 60 degree to 150 degree (the basic concept of the eight-stroke-cycle requires the slave piston to trail the master piston by 60 degree to 150 degree). For light duty engine applications, the coordination pressure management system should have a minimum adjustable range of 20 degree in order to achieve a fuel efficiency over 35% in all operational rpm and load conditions.

Before the effect and the purpose of the coordination pressure management system are fully explained, a basic understanding of the original eight-stroke-cycle is required, therefore, for the ease of comprehension, a step-by-step introduction of the eight-stroke-cycle and the 8-process sequence is provided as follows with the phase-difference adjusted to 105 degree as shown in the operation table of FIG. 8 for general medium load operation.

The master-intake-process is the process to intake air into the master cylinder during the master-intake-stroke (0 degree to 180 degree of crankshaft reference in FIG. 8); in many common applications, this master-intake-process may extend to as far as 300 degree of crankshaft reference angle or more; FIG. 1A shows the eight-stroke engine in the master-intake-process at about 30 degree of crankshaft reference, wherein the master-intake-valve 122 is opened with the camshaft system 199 to admit air into the master cylinder 110.

Figure 1B:
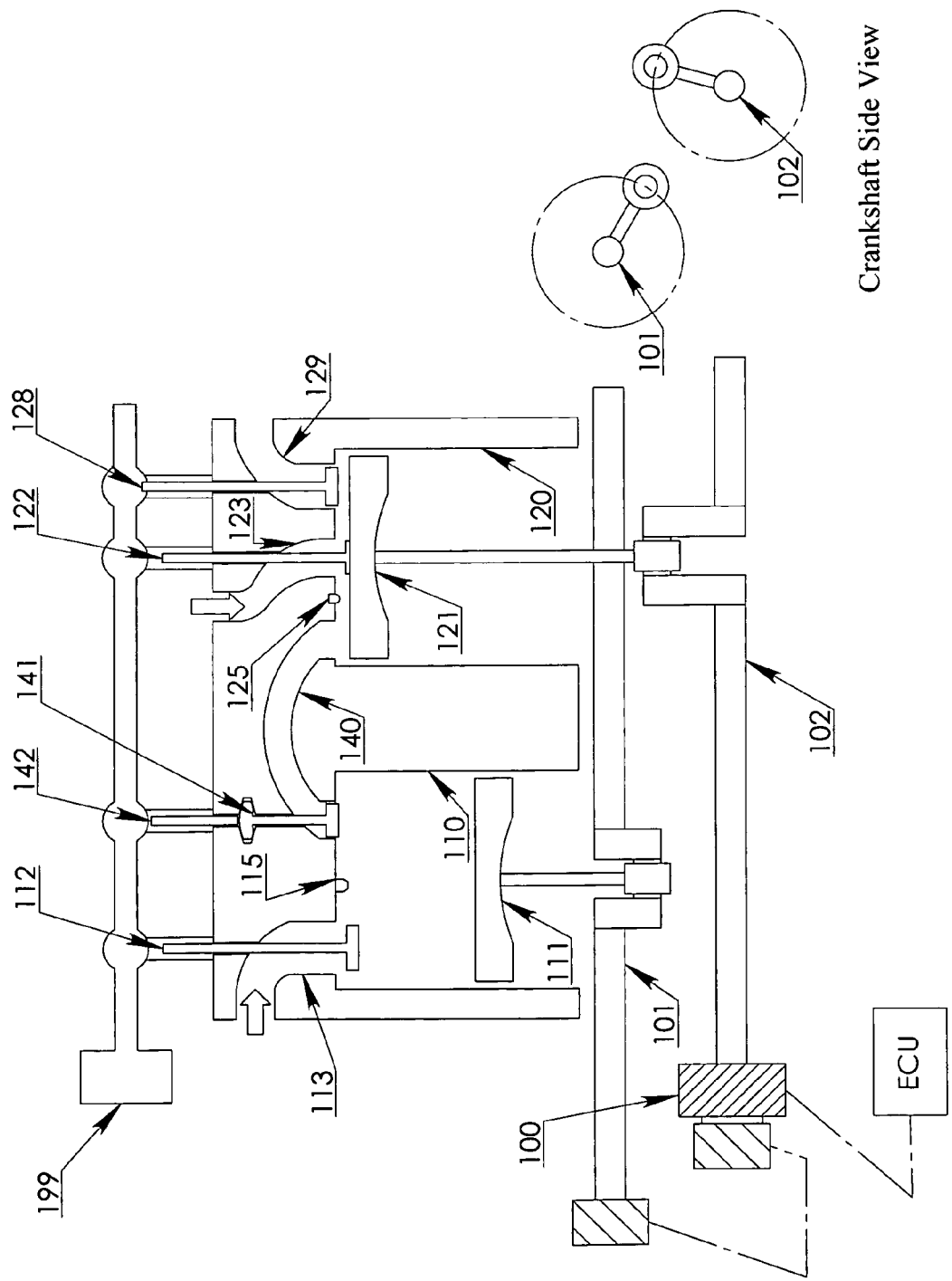
Figure 8:
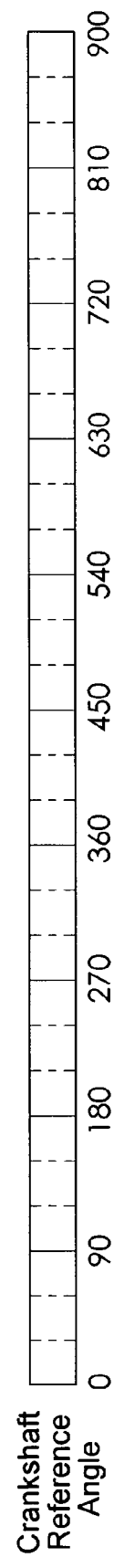
FIG. 8 shows an operation table, demonstrating the relationship between the eight-stroke-cycle and the 8-process-sequence of the medium load operation, wherein the phase-difference is adjusted to 105 degree with the crank-phase-adjustor.

The slave-intake-process is the process to intake air into the slave cylinder during the slave-intake-stroke (105 degree to 285 degree of crankshaft reference angle in FIG. 8); FIG. 1B shows the eight-stroke engine in the slave-intake-process at about 120 degree of crankshaft reference angle, wherein the slave-intake-valve 122 is opened with the camshaft system 199 to admit air into the slave cylinder 120.

Figure 1C:
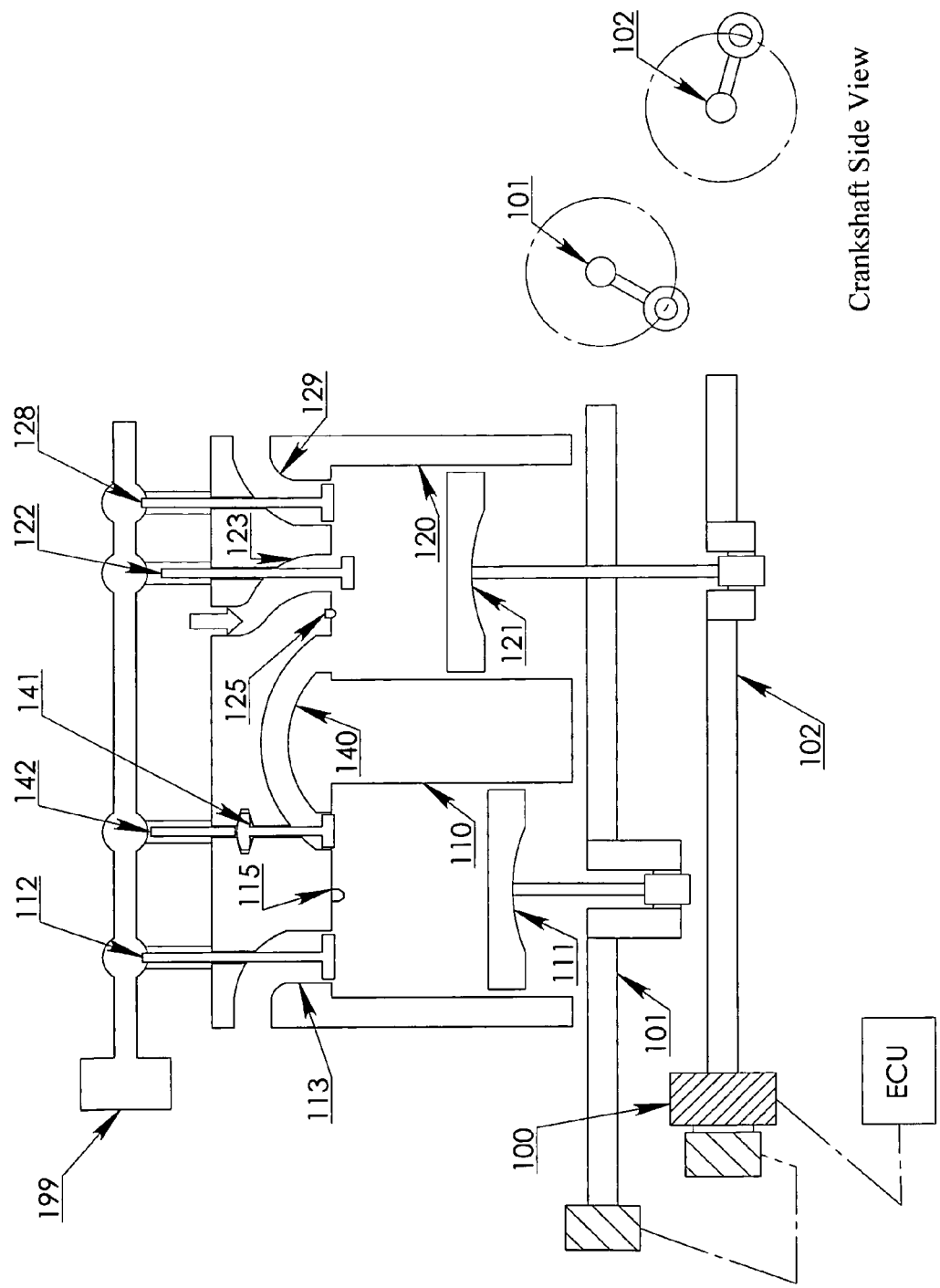

The master-compression-process is the process to compress the air in the master cylinder during the master-compression-stroke (180 degree to 360 degree of crankshaft reference in FIG. 8); FIG. 1C shows the eight-stroke engine in the master-compression-process at about 210 degree of crankshaft reference angle, wherein the master-intake-valve 112 and the coordinate-valve 141 are shut, the master piston 111 will compress the air in the master cylinder 110 as the master piston 111 reciprocates upward.

Figure 1D:
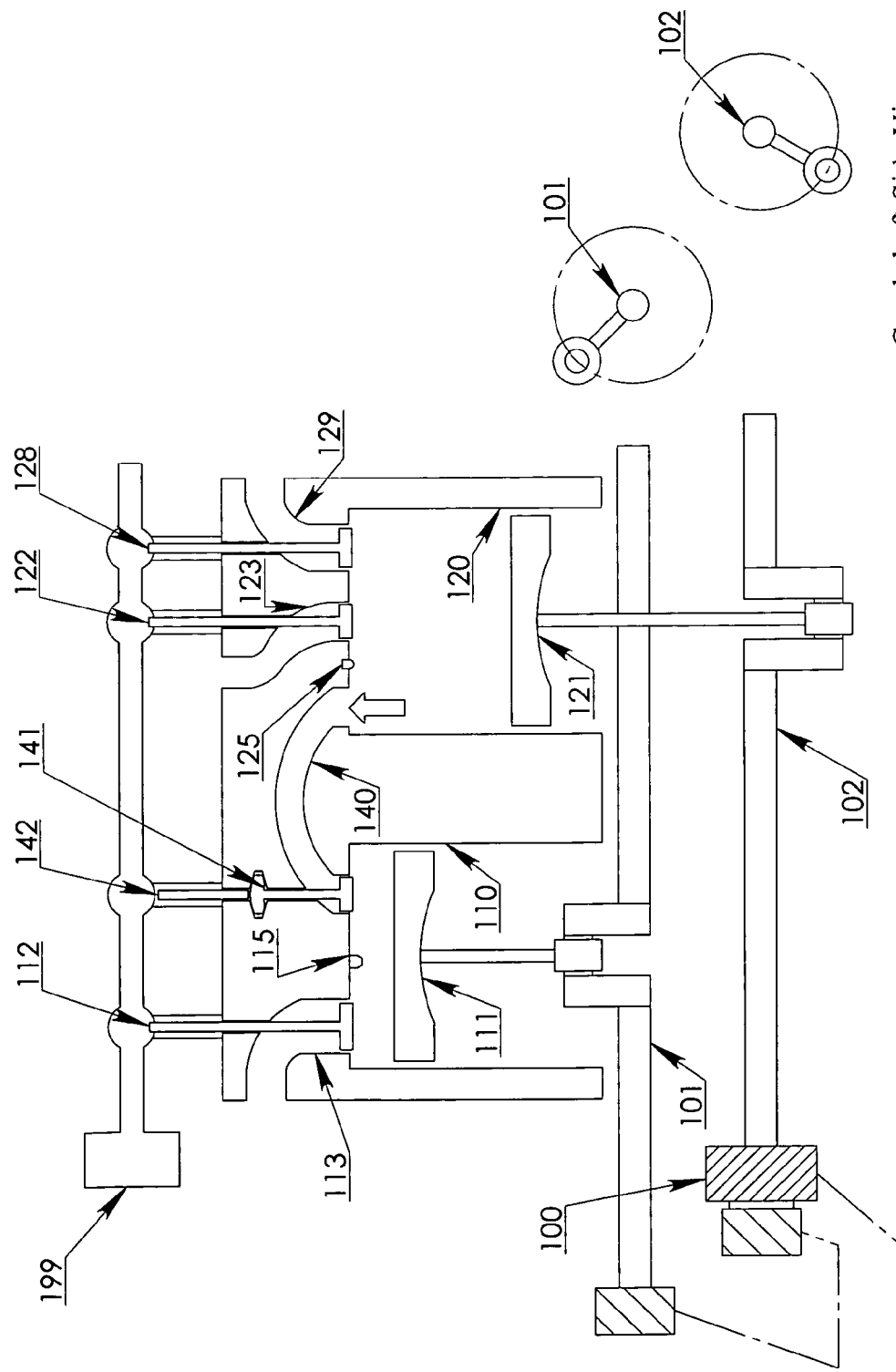

The slave-compression-process is the process to compress the air of the slave cylinder into the coordinate-port during the slave-compression-stroke (the slave-compression-process is from 285 degree to 410 degree in FIG. 8, the slave-compression-stroke is from 285 degree to 465 degree in FIG. 8), wherein the coordinate-valve remains shut to raise the air-pressure in the coordinate-port; FIG. 1D shows the eight-stroke engine in the slave-compression-process at about 315 degree of crankshaft reference angle, wherein the air of the slave cylinder 120 is compressed into the coordinate-port 140 with the slave piston 121 as a high-density-air, the slave-pressure-sensor 125 will detect the maximum compression pressure in the slave cylinder 120 during this process, and the ECU will use this information to determine if the current phase-difference requires adjustment.

The master cylinder 110 includes fuel supplying means (not shown) and the ignition means 115, and the fuel will be provided into the master cylinder 110 during the master-compression-stroke or the master-intake-stroke depending on the fuel supplying means (the carburetor can provide fuel during the master-intake-stroke, the gasoline type direct-injection-nozzle can provide fuel in both the master-intake-stroke and the master-compression-stroke, the fuel pump and the diesel type direction-injection-nozzle generally only provides fuel at the end of the master-compression-stroke or uses sequential fuel injection technology to inject the fuel twice).

Figure 1E:
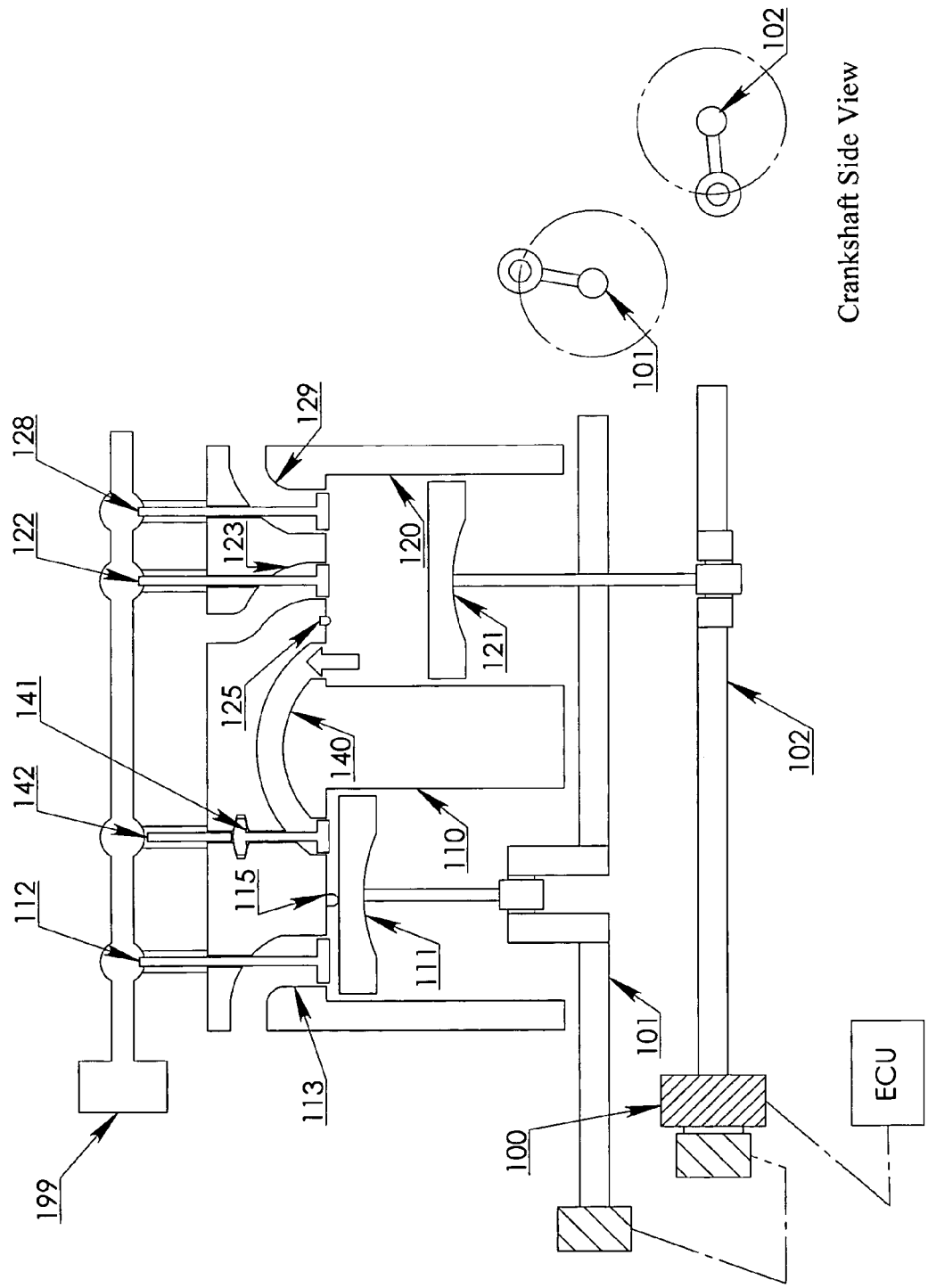

The hot-combustion-process is the process to ignite the air-fuel mixture in the master cylinder between 35 degree before the TDC position of the master piston and 40 degree after the TDC position of the master piston (or between the last 35 degree of the master-compression-stroke and the first 40 degree of the master-expansion-stroke); in this explanation, the ignition timing is assumed to be at the TDC position of the master piston as in FIG. 8, and the hot-combustion-process in this example is from 360 degree to 410 degree of crankshaft reference angle; FIG. 1E shows the eight-stroke engine in the hot-combustion-process at 370 degree of crankshaft reference angle, wherein the ignition means 115 ignites the air-fuel mixture in the master cylinder as a hot-combustion-medium, at the same time, the coordinate-valve 141 remains shut as the air-pressure in the coordinate-port 140 continues to increase until the end of the hot-combustion-process.

The injection-process is the process to inject a flow of high-density from the coordinate-port into the master cylinder after the air-pressure of the coordinate-port has reached the threshold pressure; the threshold pressure is the pressure at which the air-pressure of coordinate-port is increased to higher than the combined force of the spring tension on the coordinate-valve and the pressure of the hot-combustion-medium; the air-pressure of the coordinate-port may reach the threshold pressure at any point between 30 degree after the TDC of the master piston (the master-expansion-stroke) and 30 degree before the TDC of the slave piston (the slave-compression-stroke), the duration of the injection-process can range from 5 degree to 60 degree of crankshaft rotation.

Figure 1F:
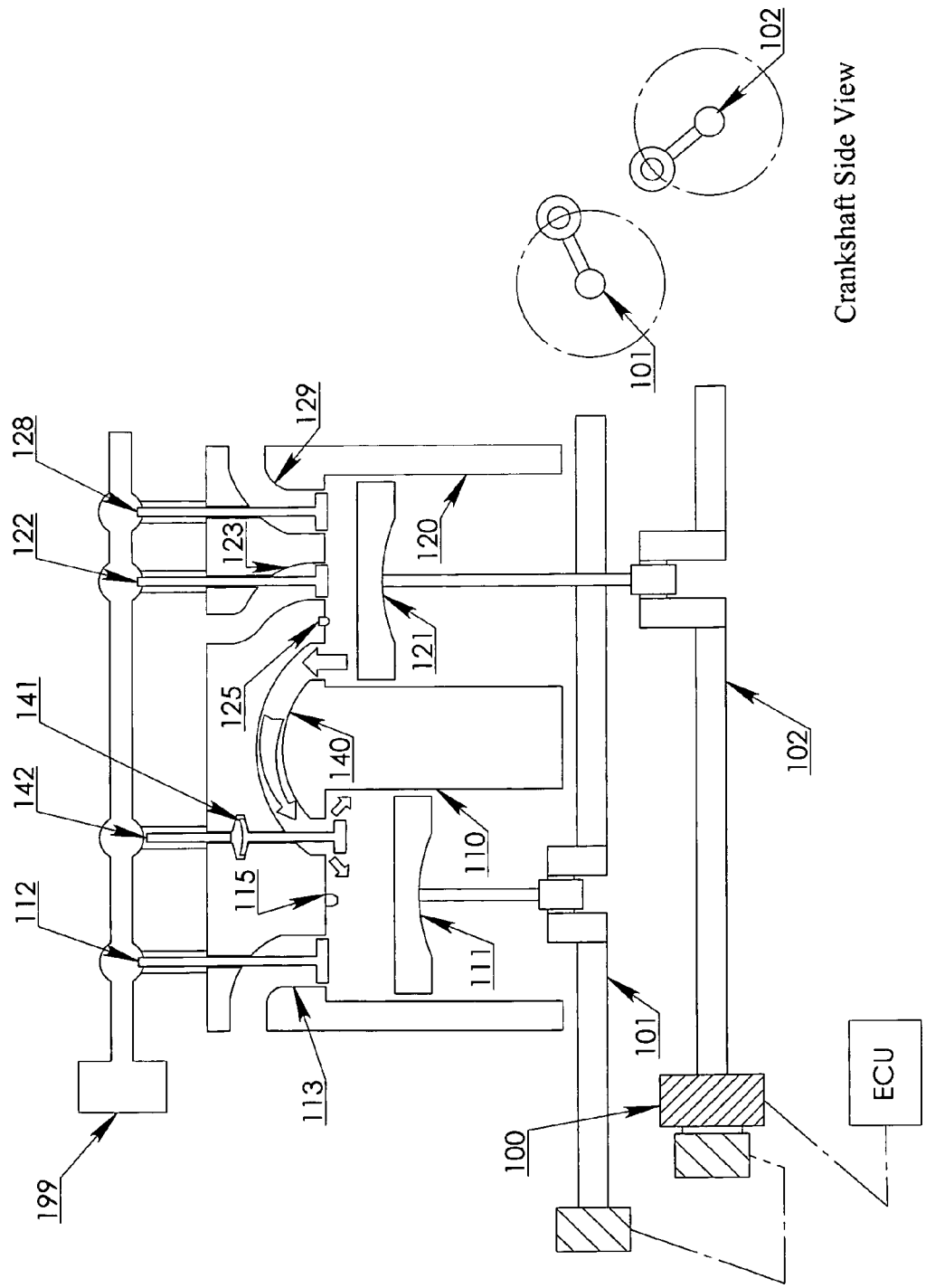

After the high-density-air of the coordinate-port is injected into the master cylinder, the coordinate-valve will be shut with the spring tension to prevent the backfiring effect before the slave-compression-stroke is completed; in the example of FIG. 8, the injection process is from about 410 degree to 450 degree of crankshaft reference angle, FIG. 1F shows the eight-stroke engine in the injection-process, the coordinate-valve 141 is opened by the abovementioned pressure difference (it can be seen that the coordinate-push-rod is remained in its original position in FIG. 1F), the high-density-air is mixed with the hot-combustion-medium in the master cylinder 110 to form a cold-expansion-medium during this process.

Figure 9:
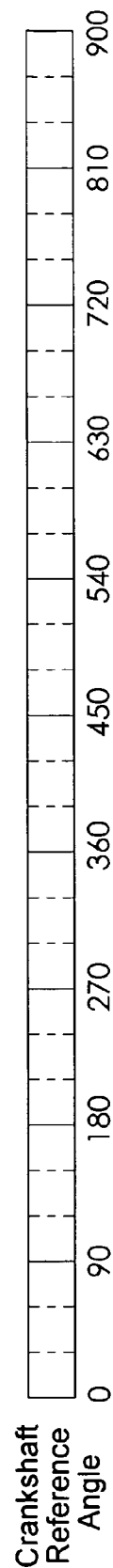
FIG. 9 shows an operation table, demonstrating the relationship between the eight-stroke-cycle and the 8-process-sequence of the heavy load operation, wherein the phase-difference is adjusted to 135 degree with the crank-phase-adjustor.

It should also be noted, to prevent the coordinate-valve from damaging, the initiation timing of the injection-process is to be controlled between 30 degree after the TDC of the master-expansion-stroke and 30 degree before the TDC of the slave-compression-stroke (this range refers to 390 degree to 435 degree of crankshaft reference angle in FIG. 8 for general medium load operation, and 390 degree to 465 degree of crankshaft reference angle in the operation table of FIG. 9 for general heavy load operation), wherein the initiation timing of the injection-process should be at least 15 degree after the ignition in the master cylinder.

Figure 1G:
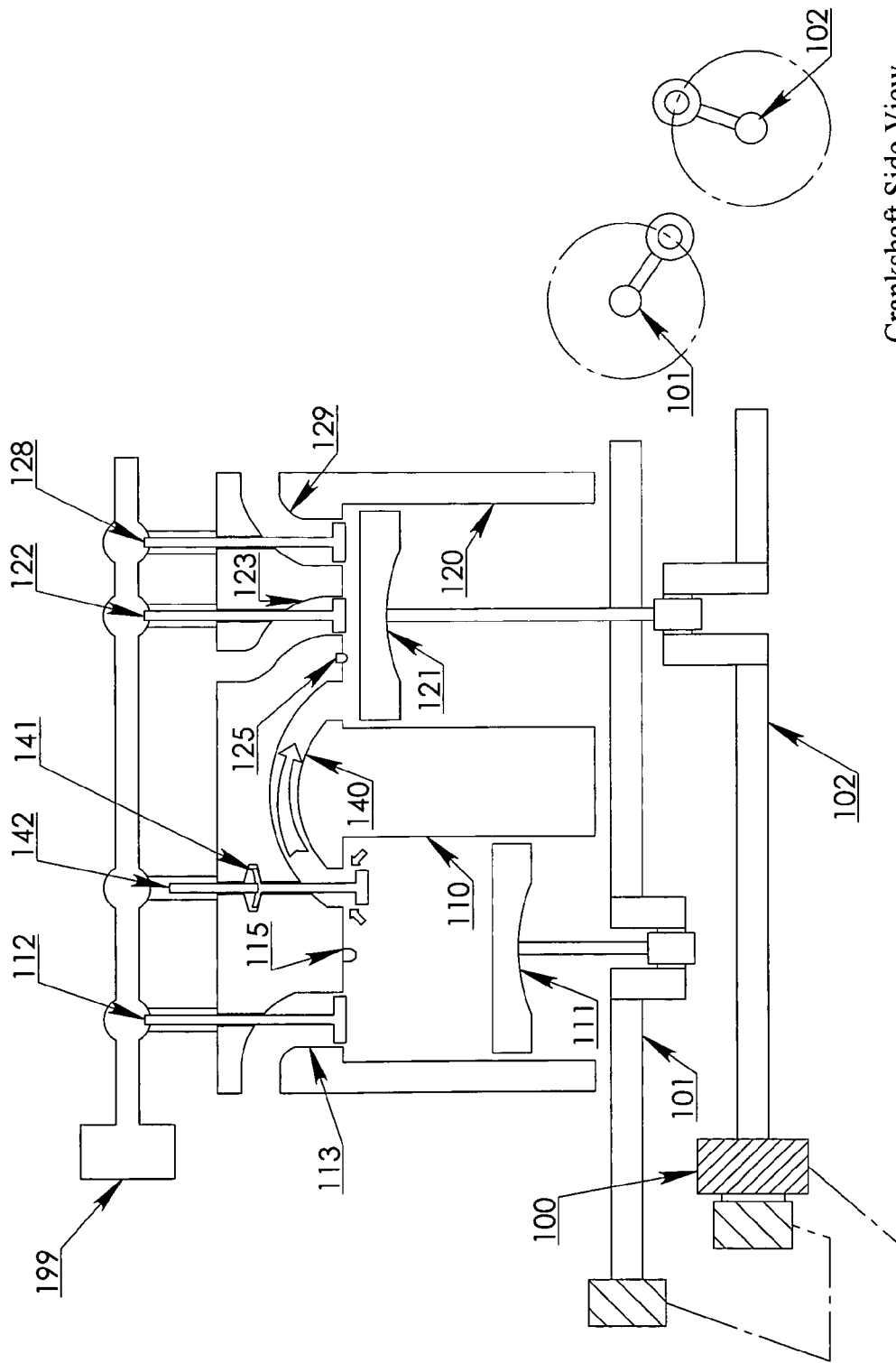

The cold-expansion-process is the process to expand the cold-expansion-medium in both the master cylinder and the slave cylinder, during this process, the cold-expansion-medium is flowing from the master cylinder to the slave cylinder through the coordinate-port, which generates power with both the master piston and the slave piston, wherein the coordinate-valve is actuated with the camshaft system; in this example as shown in the operation table of FIG. 8, the cold-expansion-process is from 465 degree to 560 degree of crankshaft reference angle; FIG. 1G shows the eight-stroke engine in the cold-expansion-process, the cold-expansion-medium is flowing from the master cylinder 110 into the slave cylinder 120 through the coordinate-port 140, the coordinate-push-rod 142 is pushing down the coordinate-valve 141 during this process, and the cold-expansion-medium will now expand in both the master cylinder 110 and the slave cylinder 120.

Figure 1H:
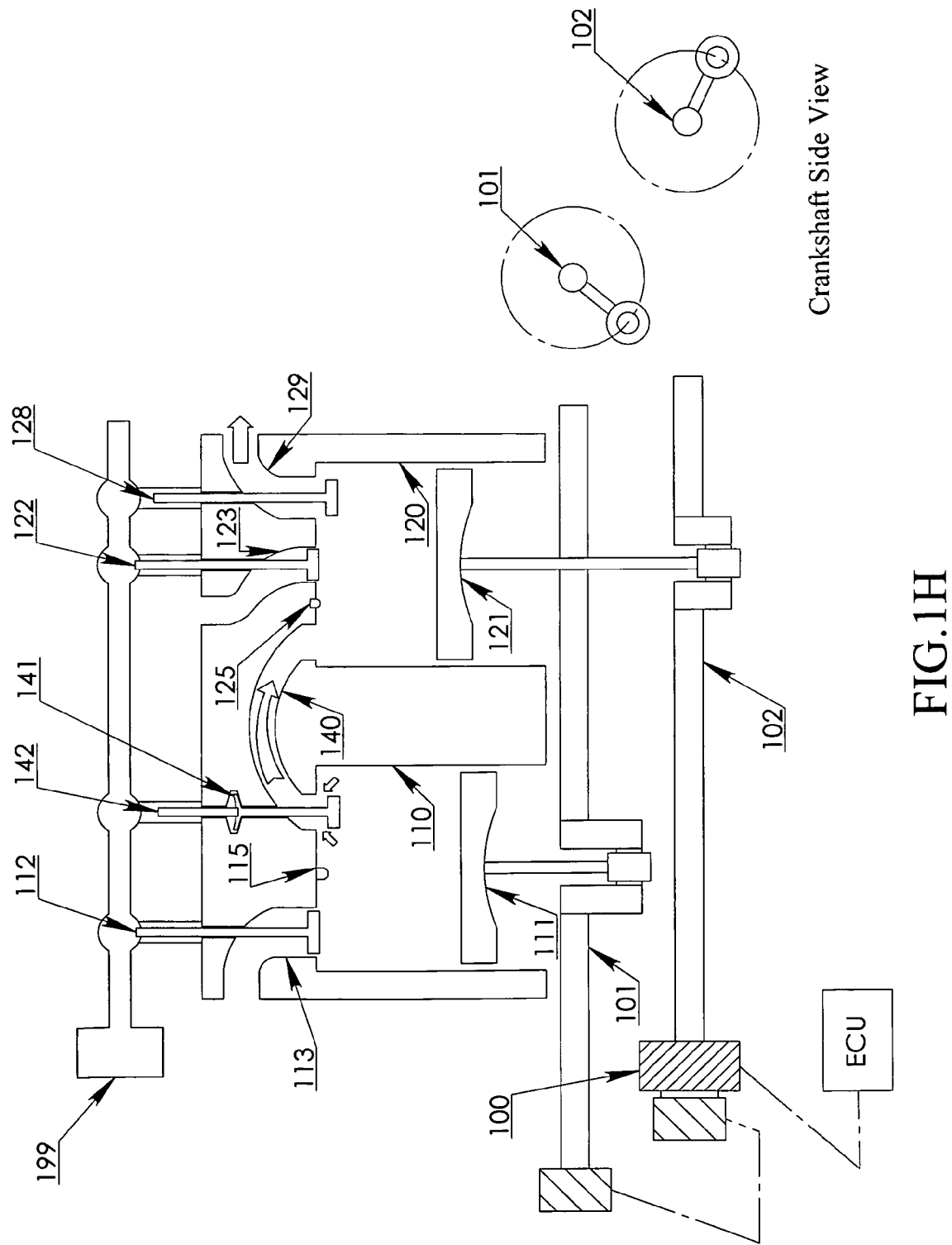

The slave-exhaust-process is the process to expel the cold-expansion-medium out of the slave cylinder and the master cylinder with the slave-exhaust-valve (an auxiliary-exhaust-valve in the master cylinder may be used to reduce the pumping loss during the master-exhaust-stroke); in this example as shown in the operation table of FIG. 8, the slave-exhaust-process is from 560 degree to 825 degree of crankshaft reference angle (the initiation of the slave-exhaust-process can vary from 520 degree to 580 degree of crankshaft reference angle for different configurations); FIG. 1H shows the eight-stroke engine in the slave-exhaust-process, the cold-expansion-medium of the master cylinder 110 will continue to flow through the coordinate-port 140 into the slave cylinder 120 until the end of the master-exhaust-stroke, and the cold-expansion-medium in the slave cylinder 120 will be expelled through the slave-exhaust-port 129.

In the case where an auxiliary-exhaust-valve is installed in the master cylinder 110 the cold-expansion-medium will be directly expelled out of the master cylinder 110 during the master-exhaust-stroke, this can generally increase fuel efficiency by another 3% for large engine due to the lower pumping loss.

Figure 7:
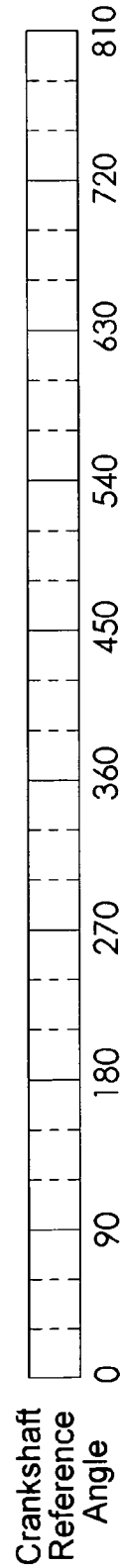
FIG. 7 shows an operation table, demonstrating the relationship between the eight-stroke-cycle and the 8-process-sequence of the light load operation, wherein the phase-difference is adjusted to 60 degree with crank-phase-adjustor.

The durations of the abovementioned 8 processes will vary in different load conditions of the present invention; it should be clear by comparing the process durations shown in the operation table of FIG. 7 (light load condition), the operation table of FIG. 8 (medium load condition), and the operation table of FIG. 9 (heavy load condition).

The simple coordinate-port design, as shown in the first embodiment, is generally used for the low cost engine, wherein the coordinate-valve will open twice in each round of the 8-process-sequence, the coordinate-valve is opened for the first time to inject the high-density-air into the master cylinder before the end of the slave-compression-stroke (up-stroke), next the coordinate-valve is opened for the second time to transfer the cold-expansion-medium from the master cylinder to the slave cylinder after the slave-expansion-stroke (down-stroke) has started.

The dual coordinate-channel design, as shown in the second embodiment, is an advanced configuration of the eight-stroke engine that consists a charge-coordinate-channel to perform the injection-process and a reverse-channel to perform the cold-expansion-process, wherein, the charge-coordinate-channel will be dedicated to the transferring of the high-density-air from the slave cylinder to the master cylinder, the reverse-channel will be dedicated to the transferring of the cold-expansion-medium from the master cylinder to the slave cylinder; the coordination pressure management system will operate on the same concept for both the simple coordinate-port design and the dual coordinate-channel design.

Now referring to FIG. 1E and FIG. 1F and FIG. 1G for the following explanation of the coordination pressure management system; a few assumptions of the pressure values and a term called the coordination-efficiency are used to demonstrate the necessity of the coordination pressure management system:

The coordination-efficiency is defined as the ratio of the overall mechanical energy harvested from the eight-stroke engine to the combined energy loss from the slave-compression-process and the heat loss through the coordination valve, the main objective of the present invention is to maximize the coordination-efficiency at any operational load condition.

Figure 10:
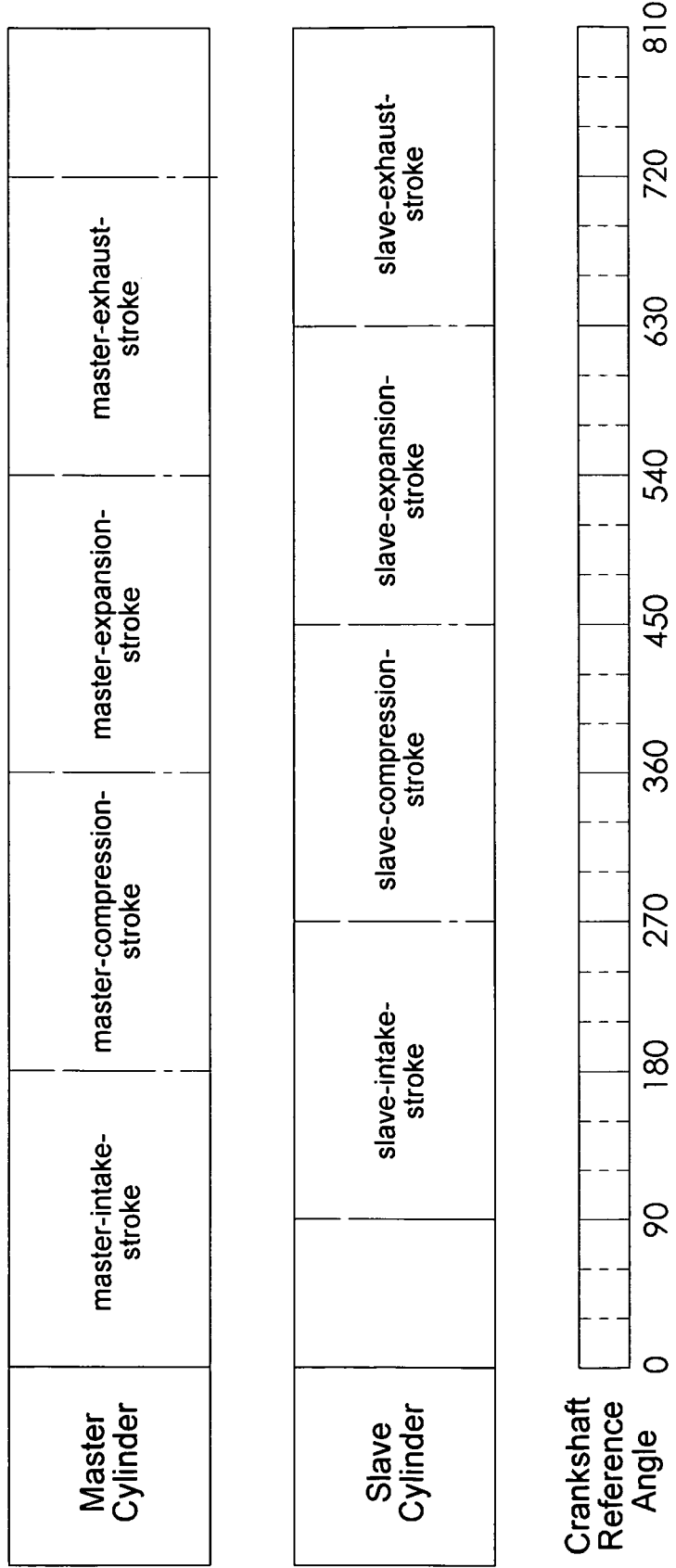
FIG. 10 shows an operation table, demonstrating a basic eight-stroke-cycle configured with 90 degree phase-difference for comparison to the conventional eight-stroke engine.

Now assuming the eight-stroke-cycle of 90 degree phase-difference without the coordination pressure management system, a reference without process duration is provided in FIG. 10 for showing the eight-stroke-cycle with 90 degree phase-difference (the pressure values are estimated with the prototype of the eight-stroke engine without the coordination pressure management system, these values are presented for understanding the drawbacks of the original eight-stroke engine and should not be considered as elements or limitations of the present invention); when the eight-stroke engine is operating in the light load condition, since less fuel is provided to combust in the master cylinder, the pressure of the hot-combustion-medium is dropped to about 150 psi at 400 degree of crankshaft reference angle (this pressure value can be lower with lean burn technology), then the coordinate-valve will start to open when the air-pressure of the coordinate-port is higher than the pressure of the hot-combustion-medium, and next the coordinate-valve will start to shut immediately after the air-pressure of the coordinate-port drops to about equal to the pressure of the hot-combustion-medium to prevent the backfiring effect, therefore the coordinate-valve is opened from about 400 degree to 430 degree of crankshaft reference angle, this causes about 20% to 40% of the high-density-air to remain in the coordinate-port when the slave piston reaches its TDC position at 450 degree of crankshaft reference, and the fraction of the compression energy for compressing this remaining portion of the high-density-air is wasted, which causes an undesired energy loss for about 20% of the total power output by the eight-stroke-cycle; in the next scenario of the heavy load operation, more fuel is provided to combust in the master cylinder, and the pressure of the hot-combusting medium may sustain at more than 350 psi even at 435 degree of crankshaft reference angle, then the coordinate-valve is opened at about 435 degree to 450 degree of crankshaft reference, assuming that the air-pressure of the coordinate-port is increased to above 350 psi at 435 degree of crankshaft reference angle (the coordinate-valve is shut until 435 degree), even though more than 90% of the high-density-air is injected into the master cylinder in this scenario, the energy used by the slave piston to compress the air to 350 psi is excessive in term of best coordination-efficiency, in addition, the heat loss through the coordinate-port and the slave cylinder resulted from this slave-compression-process is also excessive (the temperature of the high-density-air will be above 900 degree Celsius with the compression pressure of 350 psi in this scenario), which causes the overall fuel efficiency to decrease by as far as 50% in the maximum load condition tested by the prototype of the eight-stroke engine.

In short, to achieve the highest coordination-efficiency in both the light load operation and the heavy load operation, the present invention devices a solution with the coordination pressure management system, which achieves a relatively smoother transfer of the high-density-air from the coordinate-port to the master cylinder and regulates the compression energy consumed by the slave-compression-process according to the changes in the combustion condition of the master cylinder and the compression condition of the slave cylinder.

The coordination pressure management system will detect and compute the maximum compression pressure in the slave cylinder and the coordinate-port during the slave-compression-stroke with the slave-pressure-sensor, and the ECU will command the crank-phase-adjustor to control the phase-difference between the master piston and the slave piston within the range of 60 degree to 150 degree, which changes the crankshaft reference angle of the TDC position of the slave piston, thereby shifting the initiation timing of the injection-process and regulating the maximum compression pressure of the slave cylinder within 75% to 25% of the concurrent maximum combustion pressure of the master cylinder, at the same, about 90% of the high-density-air should be able to be injected into the master cylinder during the injection-process at any load condition.

With an ideal engine tunings for the best coordination-efficiency, the coordination pressure management system will have a relatively smaller phase-difference in the light load operation and can actively initiate the injection-process at a relatively earlier (smaller) crankshaft reference angle, whereas the coordination pressure manage system will have a relatively greater phase-difference in the heavy load operation and can actively initiate the injection-process at a relatively later (greater) crankshaft reference angle.

As a supplementary note, when the eight-stroke engine is adjusted to the minimum phase-difference of 60 degree, the slave-piston will reach its TDC position at 420 degree of crankshaft reference angle; when the eight-stroke engine is adjusted to the maximum phase-difference of 150 degree, the slave piston will reach its TDC position at 510 degree of crankshaft reference angle.

As in the light load operation shown in the operation table of FIG. 7, the phase-difference is decreased to 60 degree with the crank-phase-adjustor 100, assuming that the combustion pressure of the hot-combustion-medium in the master cylinder 110 is dropped to below 150 psi (approximation) at 390 degree of crankshaft reference angle, and the air-pressure of the coordinate-port 140 is raised to over 150 psi at 390 degree of crankshaft reference angle, therefore, the injection-process will be performed during 390 degree to 420 degree of crankshaft reference angle, and due to the decrease in the phase-difference, the slave piston 121 will reach its TDC position at 420 degree of crankshaft reference, thereby achieving a complete transfer of the high-density-air with more than 90% of the high-density-air injected into the master cylinder 110 (a small portion will still remain in the coordinate-port 140, it should be understood that the coordinate-port 140 occupies certain volume in the physical construction), thus raising the fuel efficiency of the eight-stroke-cycle to over 35% in the light load operation. FIG. 1. Light is an illustrative view of the eight-stroke engine at the initiation point (390 degree of crankshaft reference) of the injection-process in light load operation; it can be seen from the crankshaft side view that the phase-difference is adjusted to 60 degree with the crank-phase-adjustor 100.

As in the medium load operation shown in the operation table of FIG. 8, the phase-difference is adjusted to 105 degree with the crank-phase-adjustor 100, assuming that the pressure of the hot-combustion-medium in the master cylinder 110 drops to 300 psi and the pressure of the high-density-air in the coordinate-port 140 increases to above 300 psi at 410 degree of crankshaft reference angle, thereby the coordinate-valve 141 is opened to perform the injection-process from about 410 degree to 450 degree of crankshaft reference angle; similarly, more than 90% of the high-density-air is injected during the injection-process, and the air-pressure in the coordinate-port is limited within 25% to 75% of the concurrent maximum combustion pressure of the master cylinder 110, thereby maintaining a fuel efficiency over 35% in the medium load operation as well.

FIG. 1. Medium is an illustrative view of the eight-stroke engine at the initiation point (410 degree of crankshaft reference) of the injection-process in medium load operation; it can be seen from the crankshaft side view that the phase-difference is adjusted to 105 degree with the crank-phase-adjustor 100.

As in the heavy load operation shown in the operation table of FIG. 9, the phase-difference is adjusted to 135 degree with crank-phase-adjustor 100, assuming that the hot-combustion-medium in the master cylinder 110 drops to 350 psi and the pressure of the high-density-air in the coordinate-port 140 increases to above 350 psi at 450 degree, therefore the coordinate-valve 141 is opened to perform the injection-process from about 450 degree to 495 degree of crankshaft reference angle. It can be observed that the initiation of the injection-process will be shifted to a later (greater) crankshaft reference angle as the load increases, whereas the duration of the injection-process may vary from 5 degree to 60 degree of crankshaft rotation depending on the spring-tension of the coordinate-valve and the engine rpm configuration (the heavy duty power generator engine can have an operational rpm low as 20 rpm, whereas the small engine can have an operational rpm over 10000 rpm, the duration of the injection process can vary significantly due to the air flow speed); similarly, more than 90% of the high-density-air is injected during the injection-process, and the air-pressure of the coordinate-port is limited within 25% to 75% of concurrent maximum combustion pressure of the master cylinder 110. FIG. 1. Heavy is an illustrative view of the eight-stroke engine at the initiation point (450 degree of crankshaft reference) of the injection-process in light load operation; it can be seen from the crankshaft side view that the phase-difference is adjusted to 135 degree with the crank-phase-adjustor 100.

As a supplementary note, the concurrent maximum combustion pressure refers to the maximum pressure in the master cylinder at that particular engine load, for example, if the maximum combustion pressure of the master cylinder is 700 psi in the heavy load, the concurrent maximum combustion pressure is then 700 psi in the heavy load operation, so the air-pressure of coordinate-port is limited between 150 psi and 550 psi prior to initiation of the injection-process in the heavy load operation with the coordination pressure management system; whereas, in the case of the light load operation, the maximum combustion pressure of the master cylinder is 300 psi, the concurrent maximum combustion pressure is then 300 psi, so the air-pressure of the coordinate-port is limited between 75 psi and 225 psi prior to the initiation of the injection process in the light load operation with the coordination pressure management system.

To monitor and provide a precise control of the crank-phase-adjustor 100, the slave-pressure-sensor 125 is to be installed in the slave-cylinder 120 or the coordinate-port 140 because the volumetric efficiency varies with different intake-valve controls and intake-chargers of the slave cylinder, the slave-pressure-sensor 125 will monitor the compression pressure during the slave-compression-process, generally the maximum compression information will be sent to the ECU, and the ECU will determine if the adjustment to the phase-difference is required; in the case when the maximum compression pressure is over the pre-set value in the ECU for that particular load condition, which indicates the pressure of the coordinate-port at the initiation of the injection-process is too high, the crank-phase-adjustor 100 will be requested to shift to a greater phase-difference, which will then delay the initiation of the injection-process as the TDC position of slave-piston is shifted to a later (greater) crankshaft reference angle; in the other scenario, when the maximum compression is detected to be lower than a pre-set value at that particular load condition, the crank-phase-adjustor 100 will be requested to shift a smaller phase-difference to shift the initiation of the injection-process to an earlier (smaller) crankshaft reference angle.

For a small gasoline type eight-stroke engine is operating in the heavy load condition, wherein the maximum combustion pressure is 700 psi in the master cylinder, the pressure at the initiation of the injection-process should be controlled within the range of 75% to 25% of the maximum combustion pressure, in other words the maximum compression of the slave-compression-process should be regulated within the range from 525 psi to 175 psi in this heave load condition; whereas the initiation point of the injection-process can range between 30 degree after the TDC of the master piston (the master-expansion-stroke) and 30 degree before the TDC of the slave piston (the-slave-compression-stroke), in other words, the injection process can initiated at any point between the first 30 degree of the master-expansion-stroke and the last 30 degree of the slave-compression-stroke as long as the air pressure of the coordinate-port reaches the threshold pressure.

When the abovementioned small gasoline type eight-stroke engine is operating in the light load condition, wherein the maximum combustion pressure is 200 psi in the master cylinder, the pressure at the initiation of the injection-process should then be controlled within the range of 75% of 25% of this maximum combustion pressure, therefore the coordination pressure manage system will control the maximum compression of the slave-compression-process within the range from 150 psi to 50 psi in this light load condition.

Again, in order to achieve a high coordination-efficiency in all operational load and rpm, the crank-phase-adjustor should have a minimum adjustable range of 20 degree.

Theoretically, it is also possible to embed a pre-set matrix table of the phase-differences corresponding to all operational loads and directly command the crank-phase-adjustor 100 according to the engine load change, thereby eliminating the necessity of the slave-pressure-sensor 125, however, it is unreliable and may require additional sensors and complex computation of the air-fuel ratio, the actual air volume of the master-intake-process, the actual air volume of the slave-intake-process, any correction of the volumetric efficiency due to variable-valve-timing mechanisms and intake-charger. Even though this type of control method is included in the scope of the present invention, a coordination pressure management system without a slave-pressure-sensor may not be able to optimize the coordination-efficiency in many conditions, an example is shown below.

For an eight-stroke engine equipped with a supercharger to boost the air pressure of the slave cylinder during the slave-intake-process, the compression pressure at the low end of the operational rpm will be relatively higher than an eight-stroke engine without the supercharger, which requires the crank-phase-adjustor to shift the phase-difference to a slightly greater (later) angle to compensate the change in the low rpm range.

For an eight-stroke engine equipped with a turbocharger to boost the air pressure of the slave cylinder during the slave-intake-process, the compression pressure at the high end of the operational rpm will be relatively higher, which will then require a relatively greater phase-difference; therefore, in order to build a coordination pressure management system suitable for most applications with precise control, the slave-pressure-sensor is a necessity.

Now referring to FIG. 2A to FIG. 2H for the second embodiment, the components are labeled as follows: the master cylinder 210, the slave cylinder 220, the master piston 211, the slave piston 221, the master-intake-port 213, the slave-intake-port 223, the slave-exhaust-port 229, the master-intake-valve 212, the slave-intake-valve 222, the slave-exhaust-valve 228, the charge-coordinate-channel 250, the reverse-channel 240, the charge-coordinate-valve 251, the reverse-input-valve 241, the reverse-output-valve 242, the ignition means 215, the slave-pressure-sensor 225, the camshaft system 299, the master crankshaft 201, the slave crankshaft 202, the crank-phase-adjustor 200, and the ECU (engine control unit).

FIG. 2A to FIG. 2H are also based on the medium load condition shown in the operation table of FIG. 8 with a phase-difference of 105 degree, again, this should be noted that the phase-difference will be adjusted between 60 degree and 150 degree according to the compression condition of the slave cylinder 220 and the combustion condition of the master cylinder 210.

Figure 2A:
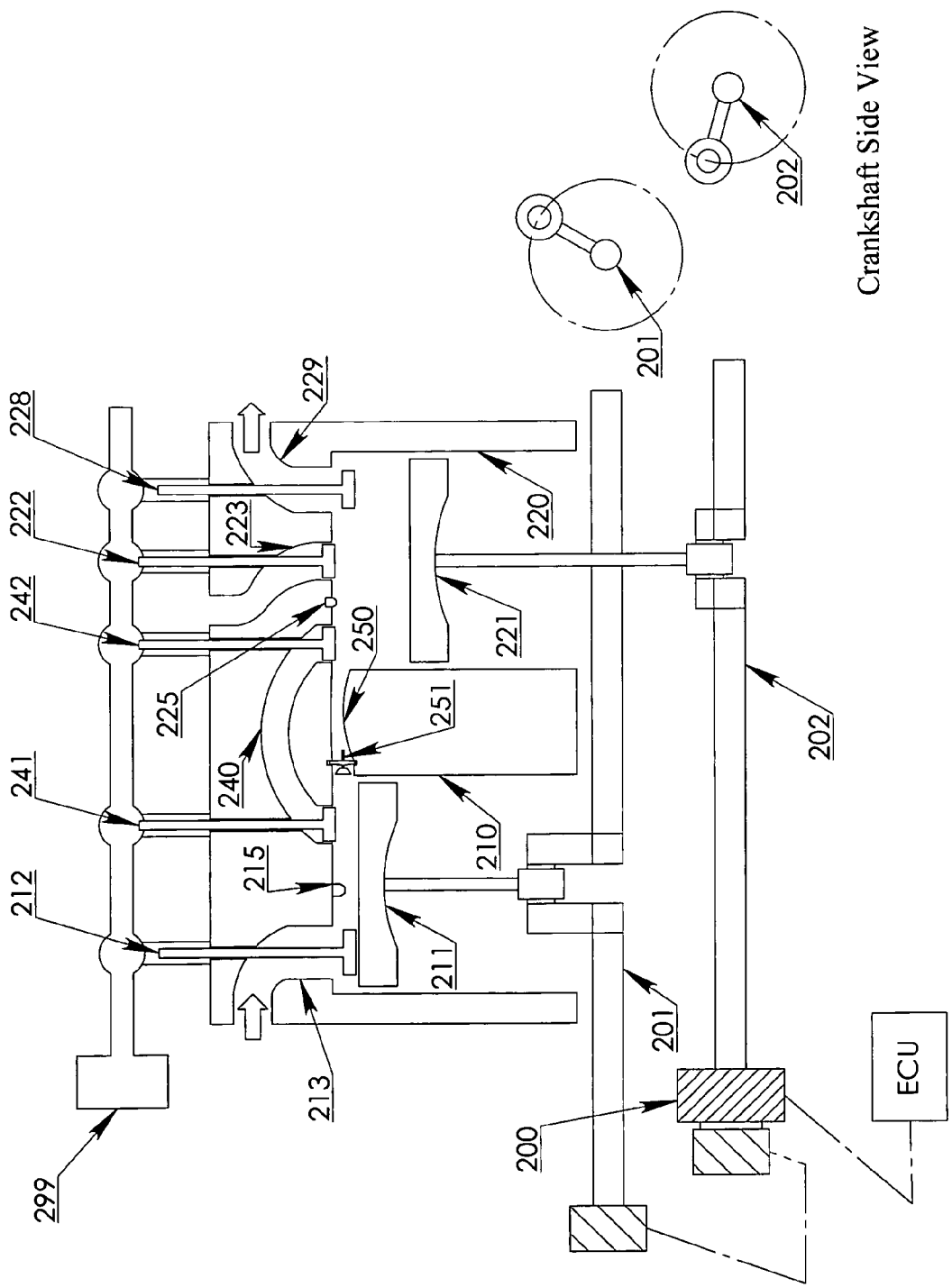
FIG. 2A to FIG. 2H are the illustrative views of the second embodiment in difference processes, wherein the phase-difference is adjusted to 105 degree with the coordination pressure management system for general medium load operation.

FIG. 2A shows the master-intake-process at 30 degree of crankshaft reference angle, the master-intake-valve 212 is opened with the camshaft system 299 to admit air into the master cylinder 210.

Figure 2B:
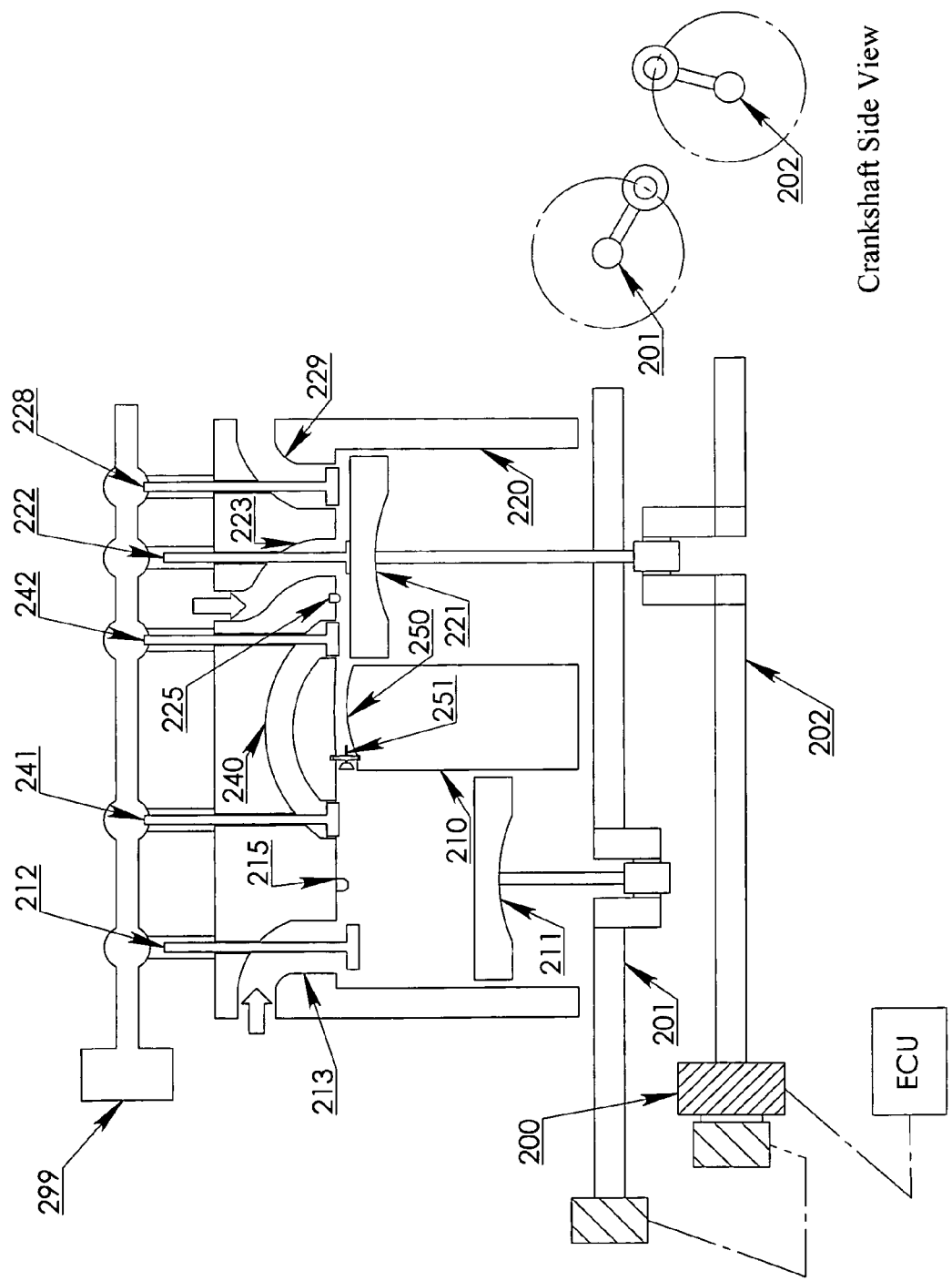

FIG. 2B shows the slave-intake-process at 120 degree of crankshaft reference angle, the slave-intake-valve 222 is opened with the camshaft system 299 to admit air into the slave cylinder 220.

Figure 2C:
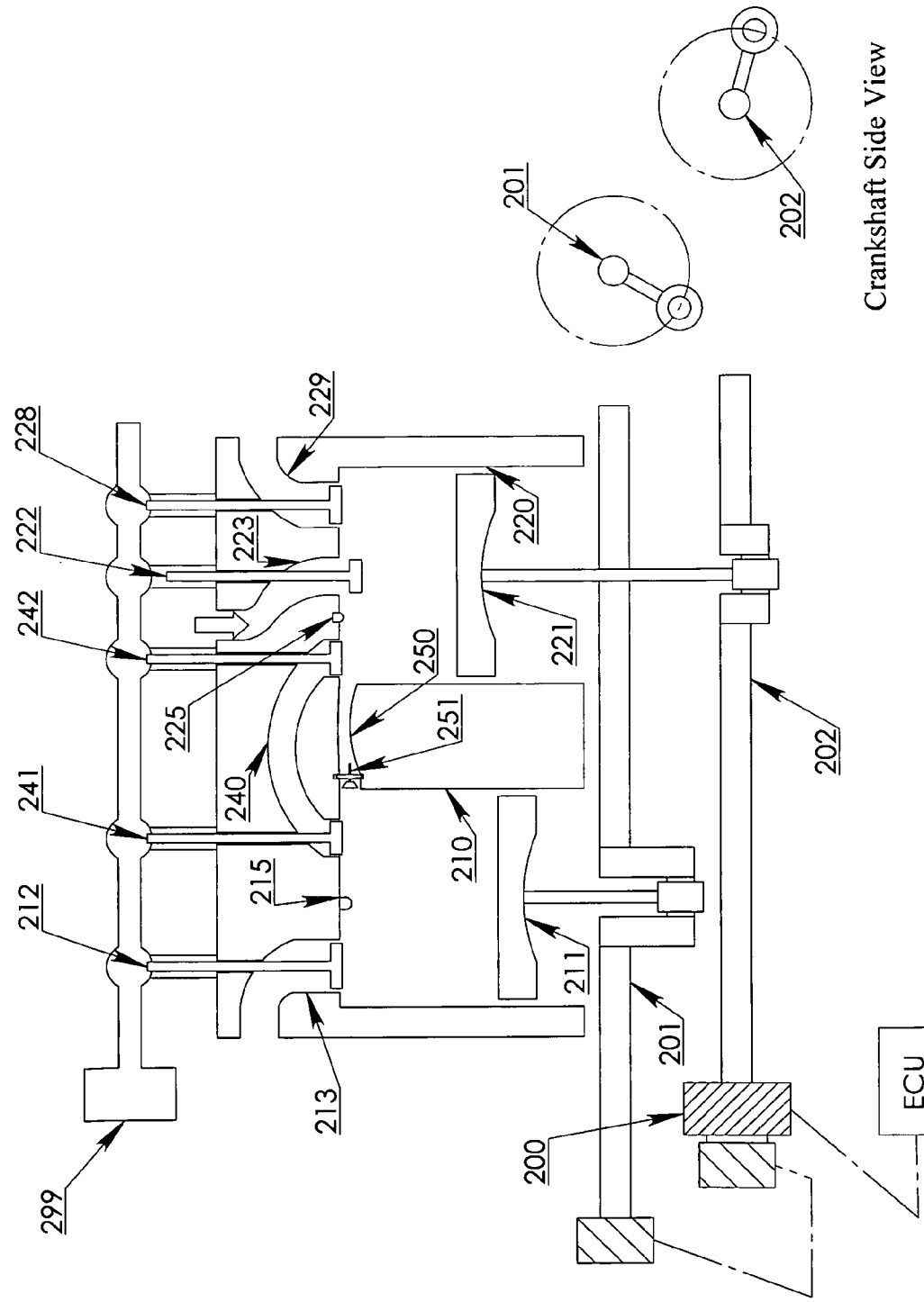

FIG. 2C shows the master-compression-process at 210 degree of crankshaft reference angle, the master piston 211 is compressing the air in the master cylinder 210.

Figure 2D:
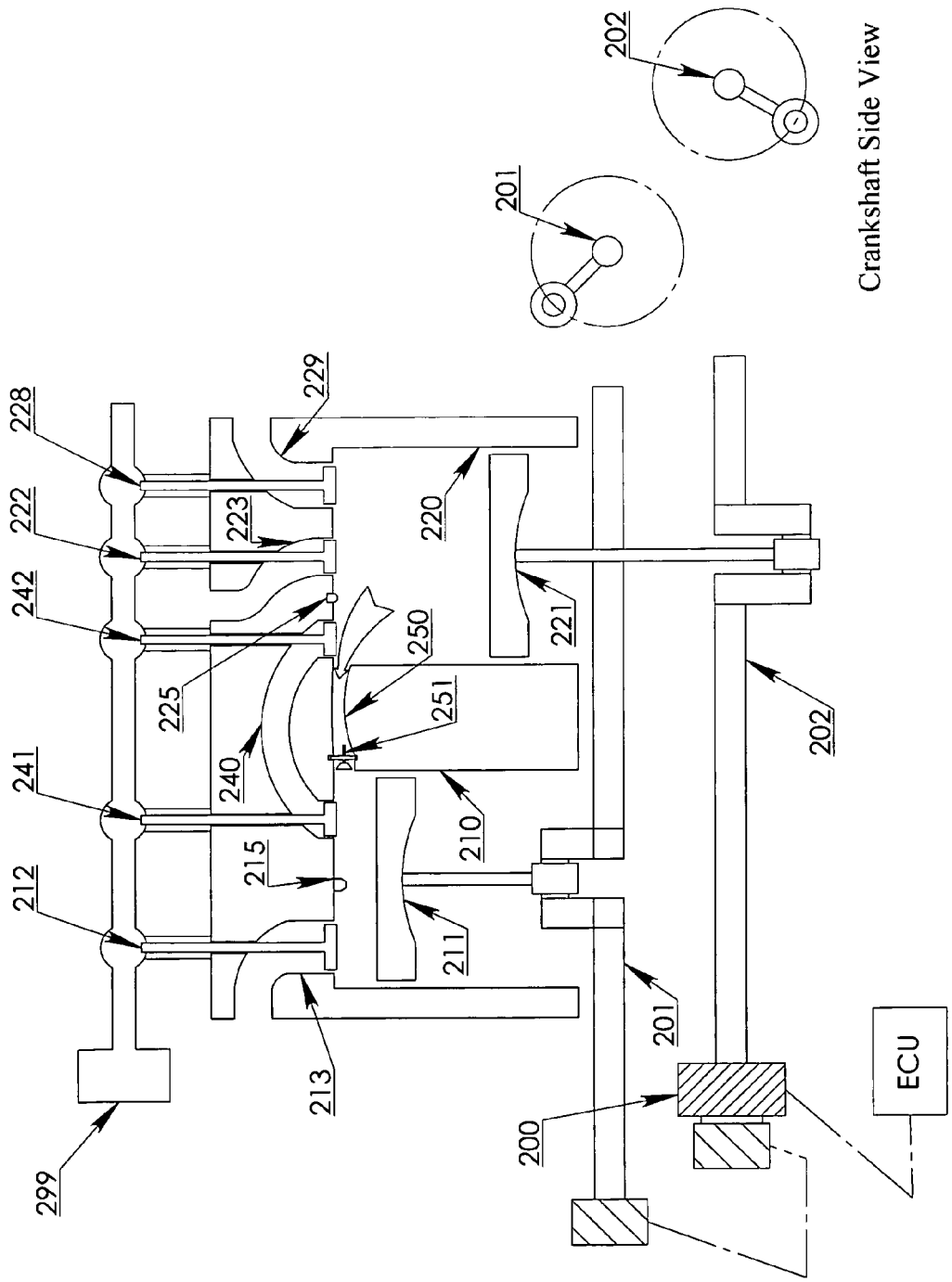

FIG. 2D shows the slave-compression-process at 315 degree of crankshaft reference angle, the slave piston 221 is compressing the air of the slave cylinder 220 into the charge-coordinate-channel 250 as a high-density-air.

Figure 2E:
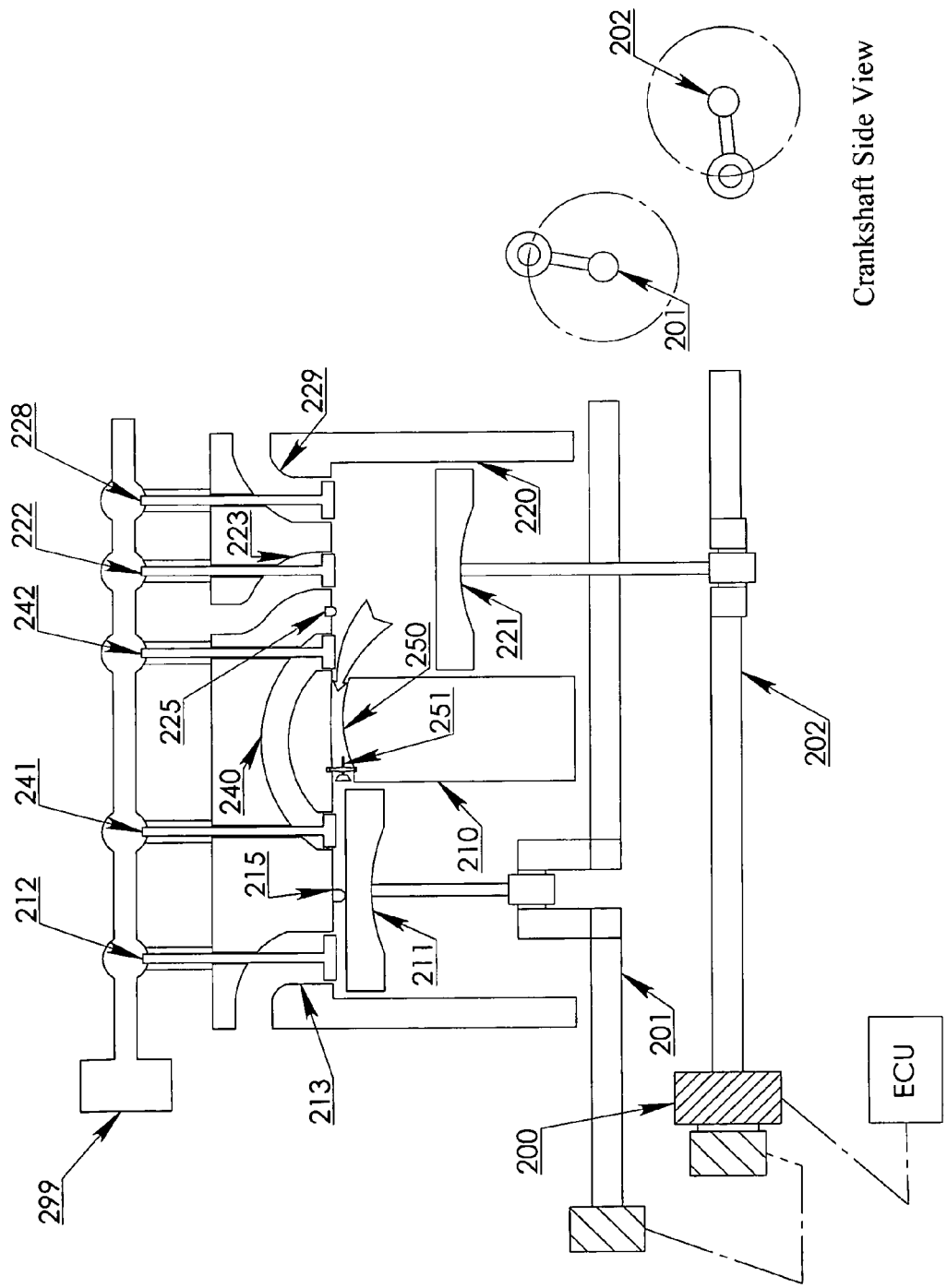

FIG. 2E shows the hot-combustion-process at 370 degree of crankshaft reference angle, an air-fuel mixture is ignited as a hot-combustion-medium in the master cylinder 210 with the ignition means 215, the air-pressure of the charge-coordinate-channel 250 is still increasing at this point.

Figure 2F:
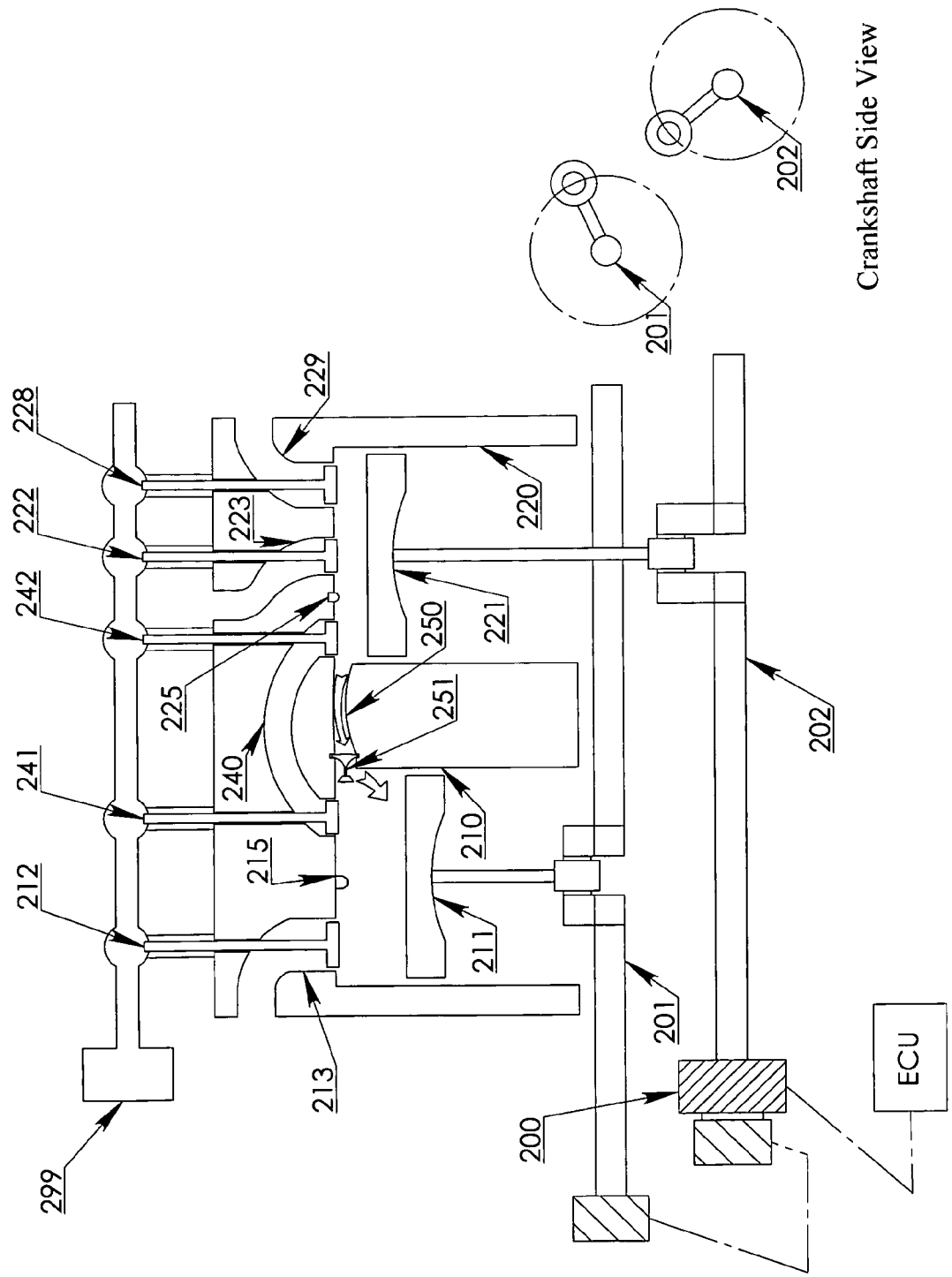

FIG. 2F shows the injection-process at 425 degree of crankshaft reference angle, the high-density-air of the charge-coordinate-channel 250 overcomes the combined force of the spring tension on the charge-coordinate-valve 251 and the pressure of the hot-combustion-medium, and the high-density-air will then be injecting into the master cylinder 210 to mix with the hot-combustion-medium to form a cold-expansion-medium.

Figure 2G:
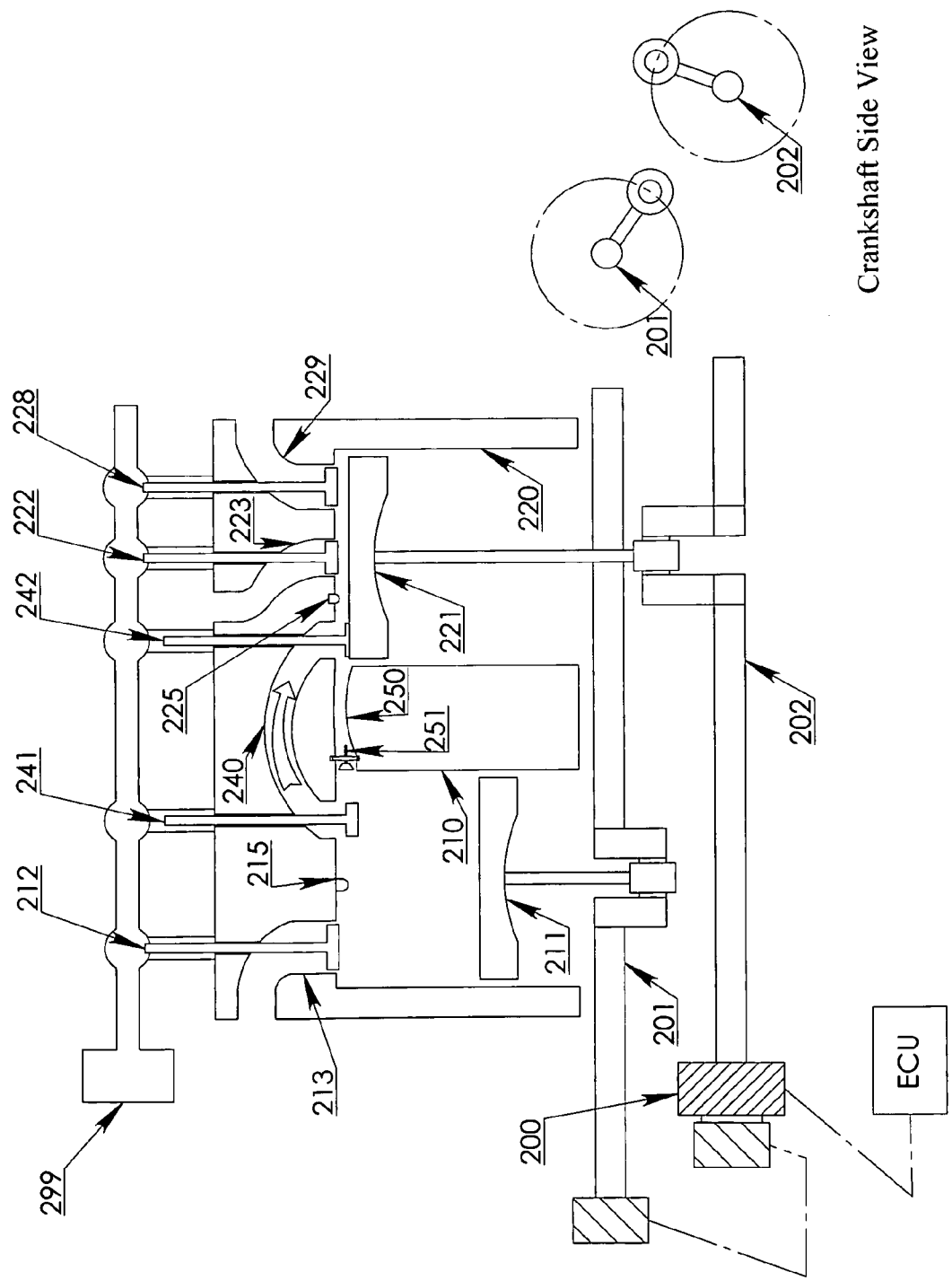

FIG. 2G shows cold-expansion-process at 485 degree of crankshaft reference angle, the reverse-input-valve 241 and the reverse-output-valve 242 are opened with the camshaft system 299 to provide a direct flow passage from the master cylinder 210 to the slave cylinder 220, the cold-expansion-medium will then expand in both the master cylinder 210 and the slave cylinder 220 during this process.

Figure 2H:
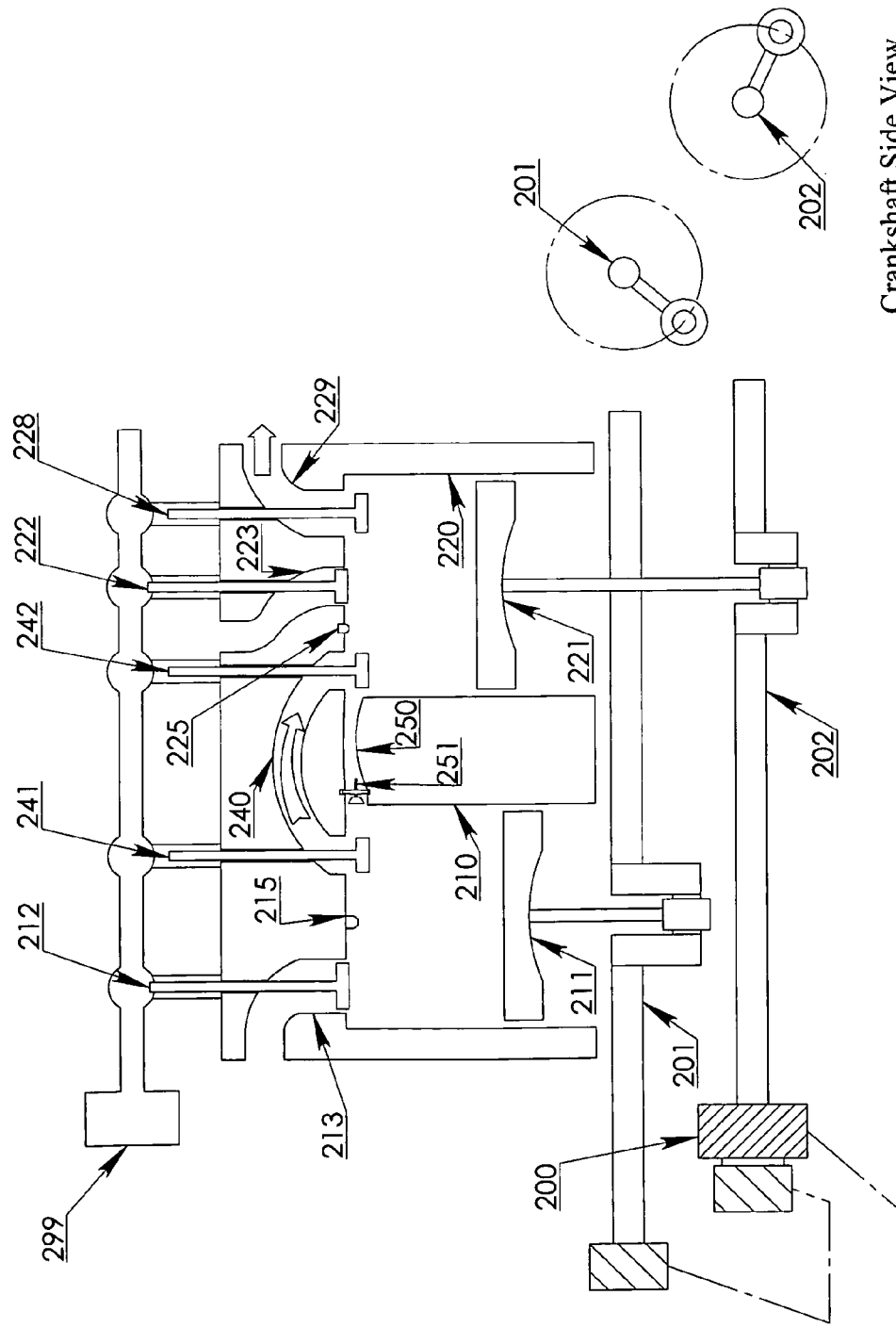
Figure 2I:
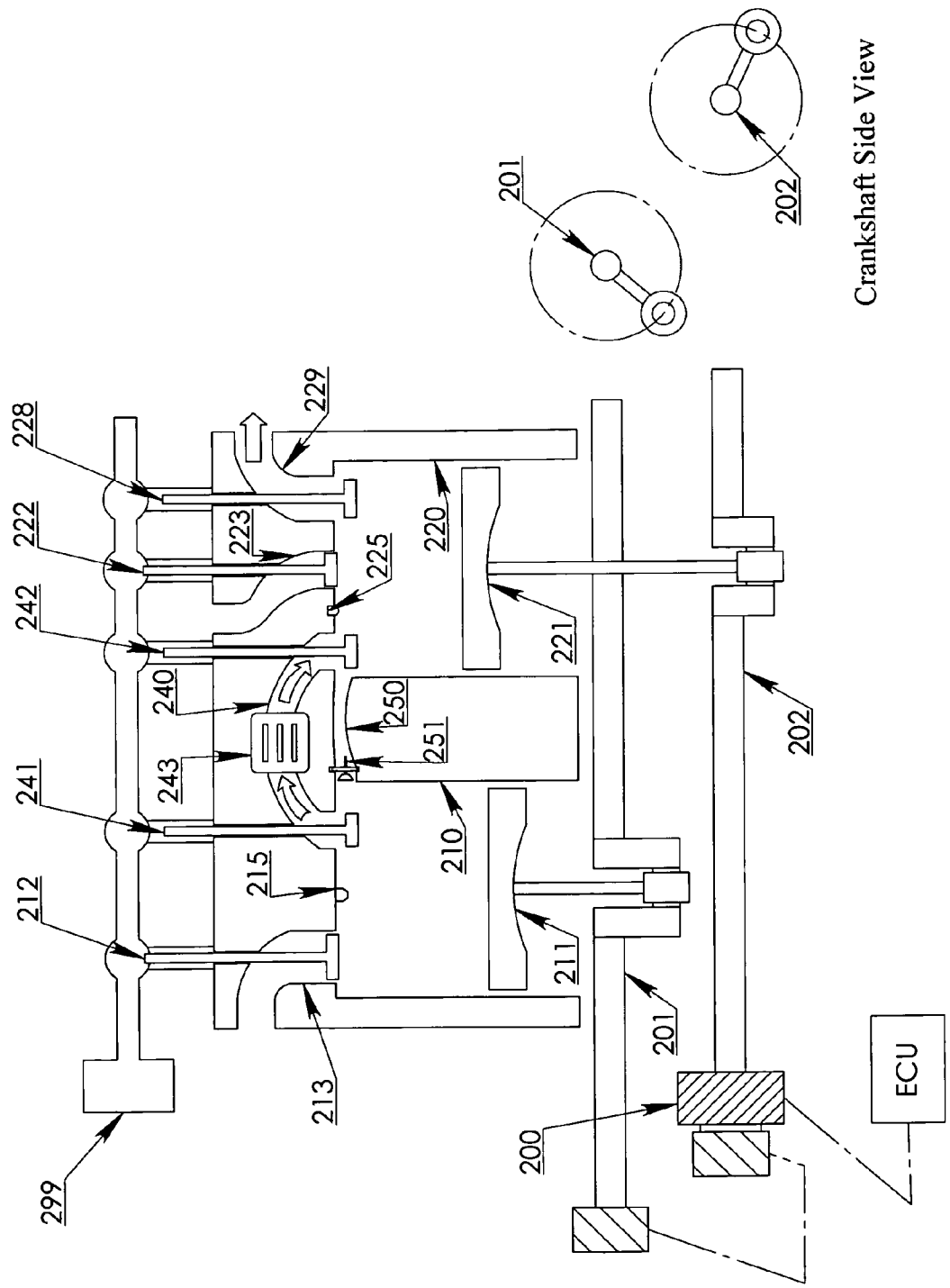
FIG. 2I shows an eight-stroke engine with a built-in catalytic converter in the reverse channel for increasing the fuel efficiency and reducing pollution in the light load operation.

FIG. 2H shows the slave-exhaust-process at 580 degree of crankshaft reference angle, the reverse-input-valve 241 and the reverse-output-valve 242 are still open to allow the cold-expansion-medium to flow from the master cylinder 210 to the slave cylinder 220, the slave-exhaust-valve 228 is opened with the camshaft system 299 to expel the cold-expansion-medium out of the slave cylinder 220 through the slave-exhaust-port 229; the reverse-input-valve 241 and the reverse-output-valve 242 will be shut with the camshaft system 299 before the master piston 210 has completed the master-exhaust-stroke.

For the second embodiment, a built-in catalytic converter 243 can be included in the reverse-channel 240 as shown in FIG. 1I, wherein the cold-expansion-medium will pass through the catalytic converter before entering the slave cylinder 220, this can increase the energy efficiency of the cold-expansion-medium and reduce the pollution in the light load operation.

The coordination pressure management system of the second embodiment will operate on the same concept as that of the first embodiment, it should be clear by now each operation table can be referred to both the first embodiment and the second embodiment; now comparing the detailed process durations shown in the operation table of FIG. 7, the operation table of FIG. 8, and the operation table of FIG. 9:

In the operation table of FIG. 7, the master-compression-process starts from 210 degree of crankshaft reference angle to adjust the volume of air required for the light load operation, and the ignition is started earlier at 350 degree of crankshaft reference angle for the light load operation; the ignition is started at 360 degree of crankshaft reference angle in the operation table of FIG. 8 and the operation table of FIG. 9; it is common to apply a valve timing similar to Miller engine or Atkinson engine to the master-intake-valve by extending the open-time to as far as 300 degree of crankshaft reference to save fuel consumption only in the light load condition; the ignition timing of the eight-stroke engine can be adjusted from 35 degree before the TDC position of the master piston and 40 degree after the TDC position of the master piston.

In the operation table of FIG. 8 and the operation table of FIG. 9, a shaded area is presented in the slave cylinder section after the column of 6th process (the injection-process), it is to note that the coordinate-valve 141 of the first embodiment and the charge-coordinate-valve 251 of the second embodiment are only open from 410 degree to 450 degree of crankshaft reference angle in that given condition, the shaded area indicates that these valve are shut after the air-pressure of the coordinate-port 140 (or the charge-coordinate-channel 250) has decreased to about equal to the pressure of the master cylinder, and then the coordinate-valve 141 (or the charge-coordinate-valve 251) is shut with the spring-tension.

The initiation timings and the durations of the injection-process vary in each operation table shown by FIG. 7-9; the injection-process starts at 390 degree of crankshaft reference angle as shown in the operation table of FIG. 7, the injection-process starts at 410 degree of crankshaft reference angle as shown in the operation table of FIG. 8, the injection-process starts at 450 degree of crankshaft reference angle as shown in the operation table of FIG. 9; the range of the initiation timing of the injection-process is from first 30 degree of the master-expansion-stroke and the last 30 degree of the slave-compression-stroke.

The initiation timings of the slave-exhaust-process also vary in each operation table shown by FIGS. 7-9; the initiation timing of the slave-exhaust-process depends on the timing that the camshaft system actuates the slave-exhaust-valve, the slave-exhaust-valve is opened at 535 degree of crankshaft reference angle in the operation table of FIG. 7, the slave-exhaust-valve is opened at 560 degree of crankshaft reference angle in the operation table of FIG. 8, the slave-exhaust-valve is opened at 570 degree of crankshaft reference angle in the operation table of FIG. 9; the initiation timing of the slave-exhaust-process can range from 520 degree to 580 degree of crankshaft reference angle, in order to achieve the best fuel efficiency, the camshaft system should include the variable valve timing mechanisms to adjust the initiation timing of the slave-exhaust-process, since the variable valve timing technology is well known to those skilled in the art, this will not be further discussed.

Various cylinder arrangements can be employed with the eight-stroke engine of the present invention, the master piston and the slave-piston can be coupled with single crankshaft or two separate crankshafts with gears.

Figure 4:
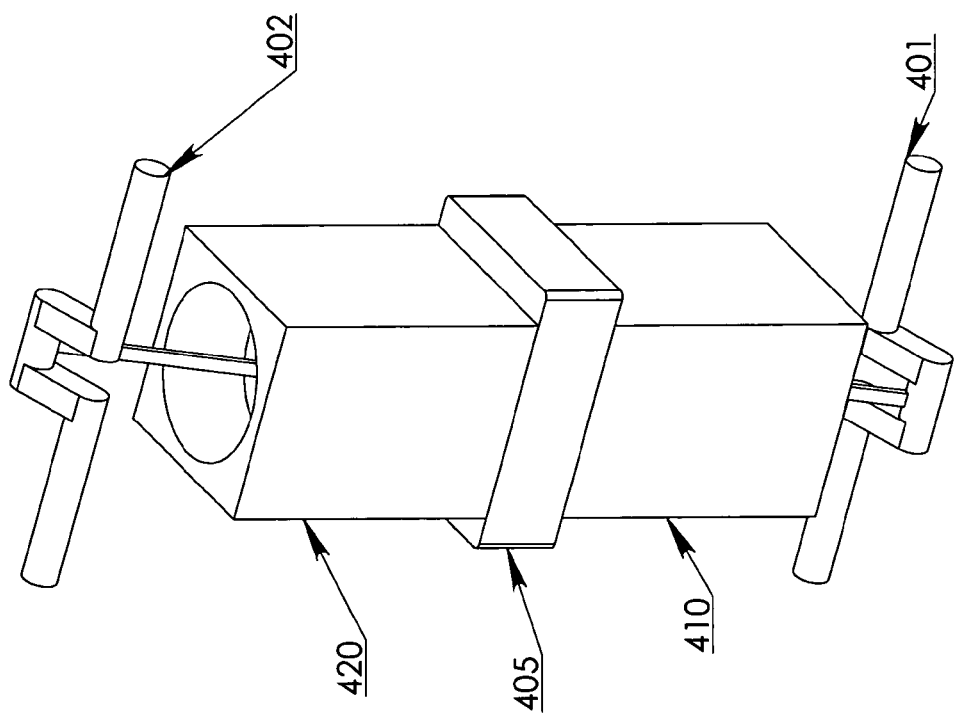
FIG. 4 shows an example of the flat-type eight-stroke engine, wherein the master piston and the slave piston can reciprocate toward each other, thereby reducing the pumping loss during the injection-process and the cold-expansion-process.

An example of the alternative cylinder arrangements is to dispose master cylinder and the slave so that the master piston and the slave piston reciprocate towards each other as in FIG. 4, the flat-type cylinder arrangement, wherein the cold-expansion-medium can expand with minimum energy loss due to the inertia of the air-flows, the components are labeled as follows: the master cylinder block 410, the slave cylinder block 420, the engine head 405, the master crankshaft 401, the slave crankshaft 402.

Figure 5:
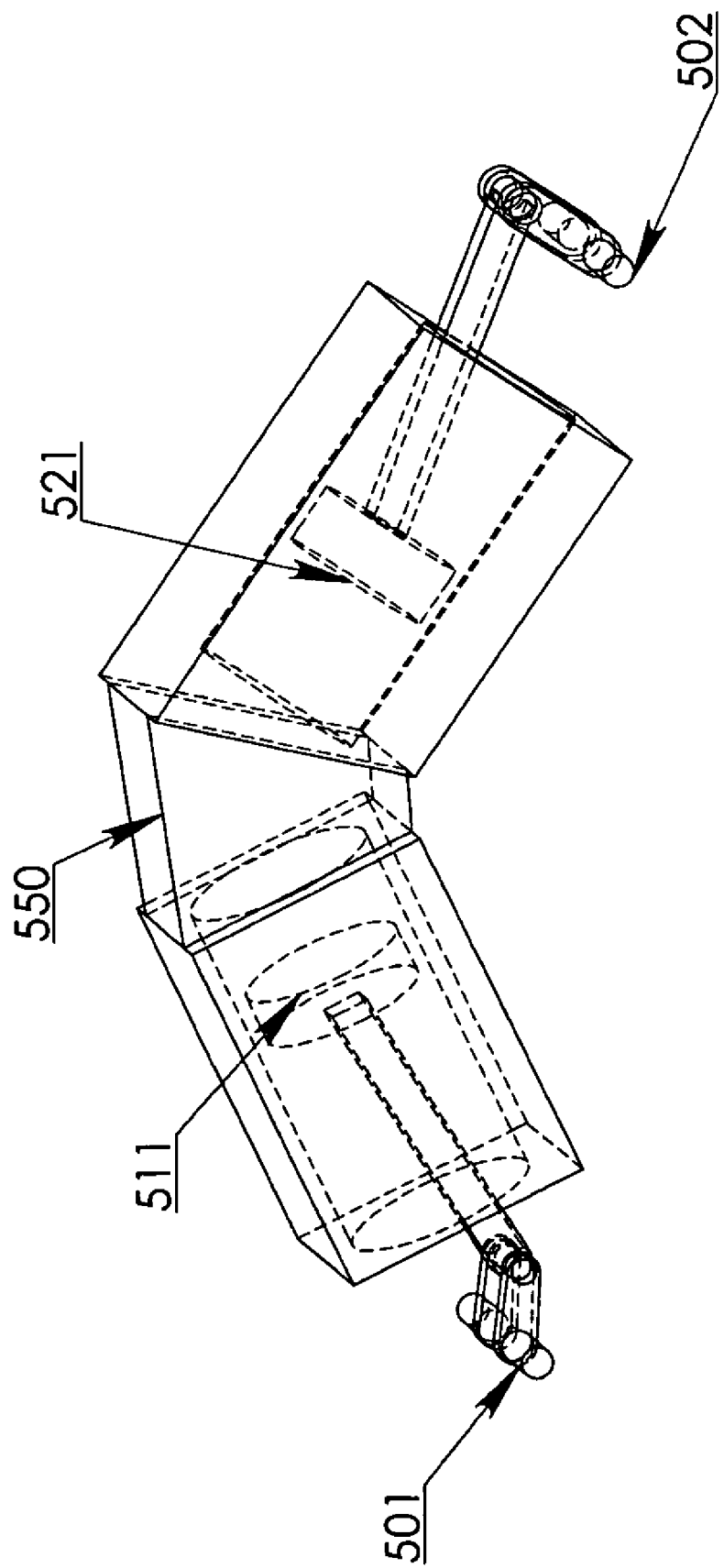
FIG. 5 shows an example of the A-type eight-stroke engine, wherein the master cylinders block and the slave cylinder block are disposed at an angle, the master piston is connected to the master crankshaft, the slave piston is connected to the slave crankshaft.

Another similar cylinder arrangement is shown in FIG. 5, the A-type cylinder arrangement, the components are labeled as follows: the master piston 511, the slave piston 521, the engine head 550, the master crankshaft 501, and the slave crankshaft 502.

Figure 6:
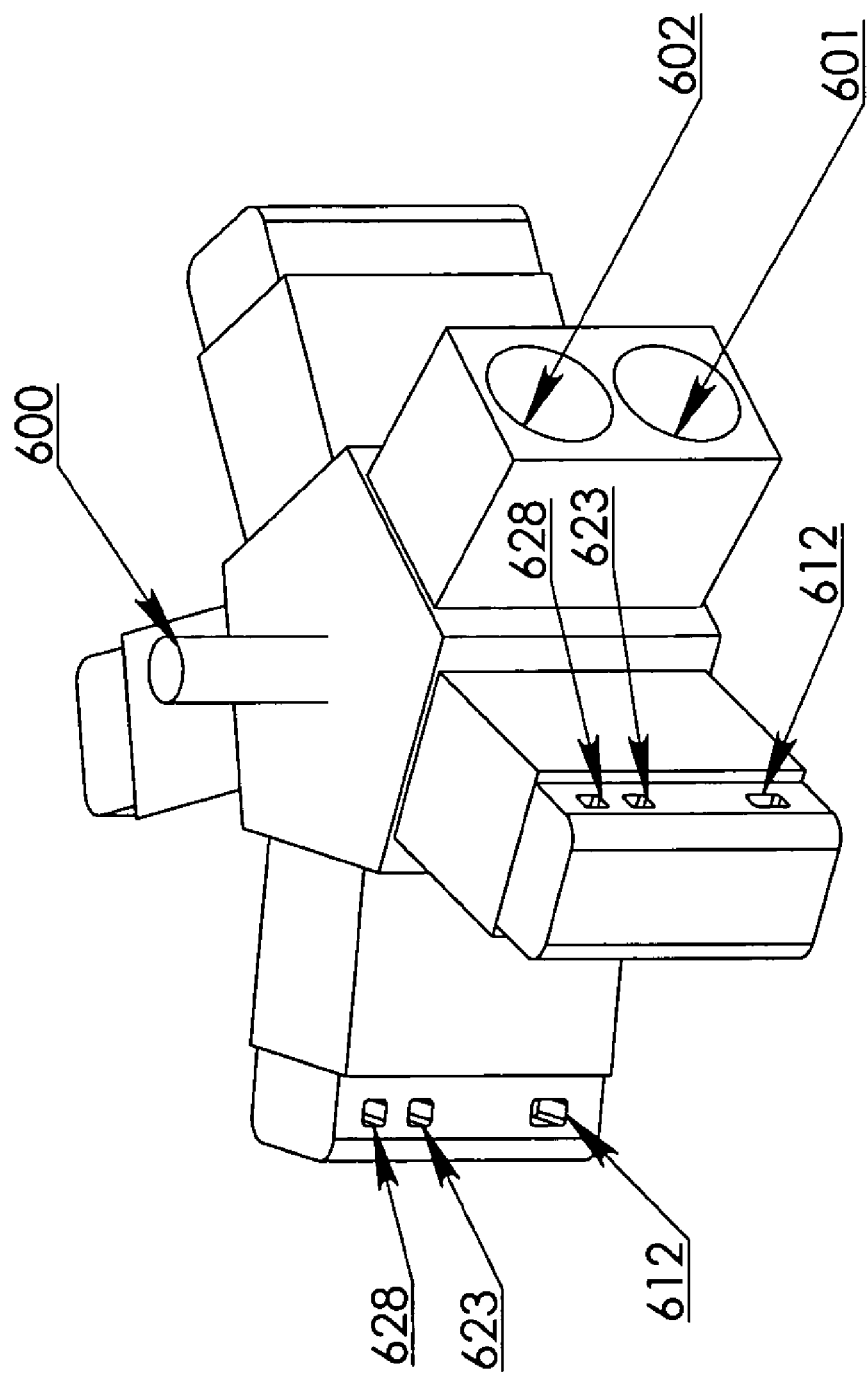
FIG. 6 shows an example of the Radial-type eight-stroke engine, wherein the 5 pairs of the master cylinder and the slave cylinder are disposed in radial configuration.

An example of the radial type eight-stroke engine is demonstrated in FIG. 6, wherein 5 sets of master cylinders 601 and slave cylinders 602 are arranged in radial configuration to share the crankshaft 600; the components are labeled as the crankshaft 600, the master cylinder 601, the slave cylinder 602, the master-intake-port 612, the slave-intake-port 623, the slave-exhaust-port 628; wherein the radial type eight-stroke engine will consist at least 3 pairs of the master cylinder and the slave cylinder.

A turbocharger system can be employed with the eight-stroke engine of the present invention to increase fuel efficiency, wherein a turbine of the turbocharger system receives a flow of cold-expansion-medium from the slave-exhaust-port, and a compressor of the turbocharger system charges a flow of pressurized air into the slave cylinder during the slave-intake-process; wherein the slave-intake-process may be shorten to allow said flow of pressurized air to expand in the slave cylinder during the slave-intake-stroke.

Figure 3:
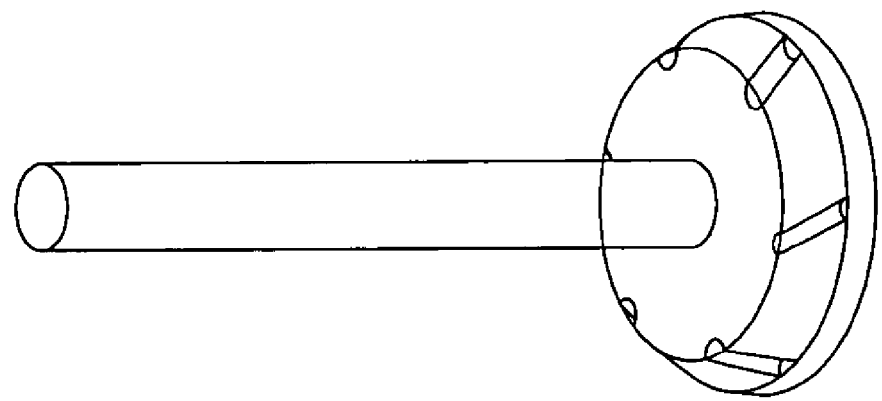
FIG. 3 shows an example of the charge-coordinate-valve (or coordinate-valve) with air-guiding-grooves for improving the cooling effect of the injection-process.

The coordinate-valve 141 (FIG. 1A) or the charge-coordinate-valve 251 (FIG. 2A) are preferably to constructed with air-guiding-grooves, as shown in FIG. 3, to inject the high-density-air in multi-directions during the injection-process, which can further speed up the mixing of the high-density-air and the hot-combustion-medium in the master cylinder.

The fuel type of the eight-stroke engine of the present invention can be gasoline, diesel, natural gas, or methanol with corresponding fuel supplying means and ignition means.

The spring equipped on the coordinate-valve 141 or the charge-coordinate-valve 251 can be an air-spring, a mechanical spring, a hydraulic spring, an electric tension-adjustable spring.

For the high speed application, the eight-stroke engine of the present invention can include an auxiliary-exhaust-valve to expel the cold-expansion-medium out of the master cylinder during the master-exhaust-stroke, thereby reducing the pumping loss through the coordinate-port (the first embodiment) or the reverse-channel (the second embodiment); in the presence of the abovementioned turbocharger system, the cold-expansion-medium from said auxiliary-exhaust-valve is also charged into the turbine of the turbocharger system to increase fuel efficiency.

Many alternative embodiments of the eight-stroke engine can also be derived from the principle and the disclosure of the present invention, and they should be still considered within the scope of the present invention by the claims set forth in the present invention.

The invention claimed is:

1. An eight-stroke engine with coordination pressure management system including:
   a) a master cylinder and a slave cylinder for generating power in an eight-stroke-cycle;
   b) a master piston associated with said master cylinder and connected to a master crankshaft;
   c) a slave piston associated with said slave cylinder and connected to a slave crankshaft;
   d) a crankshaft-phase-adjustor for actively configuring phase-difference between said master crankshaft and said slave crankshaft, said phase-difference ranging from 60 degree to 150 degree;
   e) a master-intake-valve associated with said master cylinder for admitting air into said master cylinder;
   f) a slave-intake-valve associated with said slave cylinder for admitting air into said slave cylinder;
   g) an ignition means and a fuel supplying means associated with said master cylinder for combusting an air-fuel-mixture as a hot-combustion-medium in said master cylinder;
   h) a coordinate-valve and a coordinate-port associated with both said master cylinder and slave cylinder, wherein said coordinate-valve effecting an injection of the high-density-air, compressed by said slave piston, into said master cylinder after the hot-combustion-medium has decreased a sufficient pressure; said coordinate-port effecting an air-passage for transferring a cold-expansion-medium, formed in said master cylinder, to said slave cylinder;
   i) a slave-exhaust-valve associated with said slave cylinder for expelling the cold-expansion-medium out of said slave cylinder;
   j) a coordination pressure management system for actuating the crank-phase-adjustor to actively reconfigure said phase-difference in response to changes in the power output of said eight-stroke engine.

2. An eight-stroke engine with coordination pressure management system as defined in claim 1, wherein said coordination pressure management system further includes a computation means for reconfiguring said phase-difference in response to changes in the power output of said eight-stroke engine, such that said injection of the high-density-air is performed only after the pressure of the hot-combustion-medium has decreased to lower than 75% of the peak combustion pressure of the master cylinder.

3. An eight-stroke engine with coordination process management system according to clam 2 and further including a turbocharger system, wherein a compressor of said turbocharger system charges a pressurized air to said slave-intake-valve, and a turbine of said turbocharger system receives the cold-expansion-medium from the slave-exhaust-valve for driving said compressor.

4. An eight-stroke engine with coordination pressure management system as defined in claim 3, wherein the master cylinder comprises an auxiliary-exhaust-valve for expelling the cold-expansion-medium out of the master cylinder.

5. An eight-stroke engine with coordination pressure management system according to claim 3 and further including a slave-pressure-sensor, disposed in the slave cylinder or the coordinate-port, for reporting the compression pressure of the slave cylinder to said coordination pressure management system.

6. An eight-stroke engine with coordination pressure management system as defined in claim 1, wherein said coordination pressure management system further includes a computation means for reconfiguring said phase-difference in response to changes in the power output of said eight-stroke engine, such that said slave piston compresses air to a pressure high enough for transferring at least 90% of the high-density-air to the master cylinder.

7. An eight-stroke engine including:
   a) a master cylinder and a slave cylinder generating power in an eight-stroke-cycle;
   b) a master piston associated with said master cylinder and connected to a master crankshaft;
   c) a slave piston associated with said slave cylinder and connected to a slave crankshaft;
   d) a crankshaft-phase-adjustor for actively configuring phase-difference between the master piston and the slave piston, said phase-difference ranging from 60 degree to 150 degree;
   e) a master-intake-means for performing a master-intake-process that admits air into the master cylinder;
   f) a slave-intake-means for performing a slave-intake-process that admits air into the slave cylinder;
   g) a fuel-supplying-means and an ignition-means associated with the master cylinder for performing a hot-combustion-process that combusts an air-fuel-mixture as a hot-combustion-medium in the master cylinder;
   h) an air-injection means for performing an injection-process that injects a high-density-air, compressed by the slave piston, into the master cylinder after the hot-combustion-medium has decreased a sufficient pressure;
   i) a reverse-channel and a valve-means for effecting an air-passage, from the master cylinder to the slave cylinder, and performing a cold-expansion-process that generates power to both the master piston and the slave piston by the expansion pressure of a cold-expansion-medium formed in the master cylinder;
   j) a slave-exhaust means for performing a slave-exhaust-process that expels the cold-expansion-medium out of the slave cylinder; and
   k) said eight-stroke engine further includes a coordination pressure management system for actuating said crankshaft-phase-adjustor and determining the optimum phase-difference in response to the changes in the power output of said eight-stroke engine.

8. An eight-stroke engine as defined in claim 7, wherein said phase-difference is configured by said coordination pressure management system such that, the compression pressure in the slave cylinder is regulated within 75%-25% of the peak combustion pressure in the master cylinder.

9. An eight-stroke engine as defined in claim 7, wherein said phase-difference is configured by said coordination pressure management system in response to the changes in the power output of the eight-stroke engine, such that, the pressure of the high-density-air is high enough to inject at least 90% of the high-density-air, compressed in the slave cylinder, into the master cylinder during the injection-process.

10. An eight-stroke engine according to claim 7 and further comprising a turbocharger system, wherein a compressor of said turbocharger system charges a pressurized air to said slave-intake-valve, and a turbine of said turbocharger system receives the cold-expansion-medium from the slave-exhaust-valve for driving said compressor.

11. An eight-stroke engine as defined in claim 7, wherein said air-injection means is constructed with air-guiding-grooves for injecting the high-density-air in multiple directions.

12. An eight-stroke engine according to claim 7 and further comprising a catalytic converter in said reverse-channel for increasing the expansion pressure of the cold-expansion-medium.

13. An eight-stroke engine as defined in claim 7, wherein the master cylinder further includes an auxiliary-exhaust-valve for expelling the cold-expansion-medium out of the master cylinder after the cold-expansion-process.

14. An eight-stroke engine according to claim 7 and further including a slave-pressure-sensor, disposed in the slave cylinder, for reporting the compression pressure of the slave cylinder to said coordination pressure management system.

15. An eight-stroke engine including:
- a) a master cylinder and a slave cylinder for generating power in an eight-stroke-cycle;
- b) a master piston associated with said master cylinder and connected to a master crankshaft;
- c) a slave piston associated with said slave cylinder and connected to a slave crankshaft;
- d) a crankshaft-phase-adjustor for actively configuring phase-difference between the master piston and the slave piston, said phase-difference ranging from 60 degree to 150 degree;
- e) a master-intake-means for admitting air into the master cylinder;
- f) a slave-intake-means for admitting air into the slave cylinder;
- g) a fuel-supplying-means and an ignition-means associated for combusting an air-fuel-mixture as a hot-combustion-medium in the master cylinder;
- h) a charge-coordinate-channel and a charge-coordinate-valve for injecting a high-density-air, compressed by the slave piston, into the master cylinder after the hot-combustion-medium has decreased a sufficient pressure;
- i) a reverse-channel for effecting an air-passage for transferring a cold-expansion-medium, formed in the master cylinder, from the master cylinder to the slave cylinder, said cold-expansion-medium generating power to both the master piston and the slave piston during the transferring;
- j) a slave-exhaust means for expelling the cold-expansion-medium out of the slave cylinder; and
- k) said eight-stroke engine further includes a coordination pressure management system for actuating said crankshaft-phase-adjustor and determining the optimum phase-difference in response to the changes in the power output of said eight-stroke engine.

16. An eight-stroke engine as defined in claim 15, wherein said phase-difference is configured by said coordination pressure management system such that, the compression pressure in the slave cylinder is regulated within 75%-25% of the peak combustion pressure in the master cylinder.

17. An eight-stroke engine as defined in claim 15, wherein said phase-difference is configured by said coordination pressure management system in response to the changes in the power output of the eight-stroke engine, such that, the compression pressure of the slave cylinder is high enough to inject at least 90% of the high-density-air, compressed in the slave cylinder, into the master cylinder.

* * * * *